United States Patent
Brandwine et al.

(10) Patent No.: US 11,588,886 B2
(45) Date of Patent: Feb. 21, 2023

(54) MANAGING REPLICATION OF COMPUTING NODES FOR PROVIDED COMPUTER NETWORKS

(71) Applicant: Amazon Technologies, Inc., Seattle, WA (US)

(72) Inventors: Eric Jason Brandwine, Haymarket, VA (US); Kevin Christopher Miller, Herndon, VA (US); Andrew J. Doane, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/693,186

(22) Filed: Mar. 11, 2022

(65) Prior Publication Data

US 2022/0279040 A1  Sep. 1, 2022

Related U.S. Application Data

(63) Continuation of application No. 17/163,242, filed on Jan. 29, 2021, now Pat. No. 11,277,471, which is a
(Continued)

(51) Int. Cl.
*G06F 15/173* (2006.01)
*H04L 67/1029* (2022.01)
(Continued)

(52) U.S. Cl.
CPC ...... *H04L 67/1029* (2013.01); *G06F 9/45533* (2013.01); *G06F 9/45558* (2013.01);
(Continued)

(58) Field of Classification Search
CPC ............. H04L 67/1029; H04L 67/1097; H04L 61/2503; G06F 9/45533
(Continued)

(56) References Cited

U.S. PATENT DOCUMENTS 6,324,580 B1 * 11/2001 Jindal ................... H04L 67/101
709/228
6,336,134 B1 * 1/2002 Varma ................... H04L 67/131
709/204
(Continued)

FOREIGN PATENT DOCUMENTS

CN   102598591   7/2012
EP   1713231     10/2006

OTHER PUBLICATIONS

Masahiro Satou, et al., "Server Side Networking for Cloud Data Centers", 2012 IEEE 1st International Conference on Cloud Networking (CLOUDNET), Nov. 28, 2012, pp. 17-22.
(Continued)

*Primary Examiner* — Anthony Mejia
(74) *Attorney, Agent, or Firm* — Robert C. Kowert; Kowert, Hood, Munyon, Rankin & Goetzel, P.C.

(57) ABSTRACT

Techniques are described for providing managed computer networks, such as for managed virtual computer networks overlaid on one or more other underlying computer networks. In some situations, the techniques include facilitating replication of a primary computing node that is actively participating in a managed computer network, such as by maintaining one or more other computing nodes in the managed computer network as replicas, and using such replica computing nodes in various manners. For example, a particular managed virtual computer network may span multiple broadcast domains of an underlying computer network, and a particular primary computing node and a corresponding remote replica computing node of the managed virtual computer network may be implemented in distinct broadcast domains of the underlying computer network, with the replica computing node being used to transparently replace the primary computing node in the virtual
(Continued)

computer network if the primary computing node becomes unavailable.

20 Claims, 14 Drawing Sheets

Related U.S. Application Data continuation of application No. 16/825,871, filed on Mar. 20, 2020, now Pat. No. 10,911,528, which is a continuation of application No. 15/154,818, filed on May 13, 2016, now Pat. No. 10,601,909, which is a continuation of application No. 14/629,234, filed on Feb. 23, 2015, now Pat. No. 9,342,412, which is a continuation of application No. 12/786,310, filed on May 24, 2010, now Pat. No. 8,966,027.

(51) Int. Cl.
| | |
|---|---|
| *G06F 9/455* | (2018.01) |
| *G06F 11/14* | (2006.01) |
| *H04L 61/5007* | (2022.01) |
| *G06F 11/20* | (2006.01) |
| *H04L 61/2503* | (2022.01) |
| *H04L 67/1097* | (2022.01) |
| *H04L 101/668* | (2022.01) |

(52) U.S. Cl.
CPC ...... *G06F 11/1484* (2013.01); *G06F 11/2007* (2013.01); *H04L 61/2503* (2013.01); *H04L 61/5007* (2022.05); *H04L 67/1097* (2013.01); *G06F 11/2038* (2013.01); *G06F 11/2048* (2013.01); *G06F 11/2097* (2013.01); *G06F 2009/45562* (2013.01); *G06F 2201/85* (2013.01); *H04L 2101/668* (2022.05)

(58) Field of Classification Search
USPC ........................................................ 709/226
See application file for complete search history.

(56) References Cited

U.S. PATENT DOCUMENTS

| | | | | |
|---|---|---|---|---|
| 6,366,558 | B1* | 4/2002 | Howes | H04L 67/1034 |
| | | | | 370/254 |
| 6,411,967 | B1 | 6/2002 | Van Renesse | |
| 6,411,991 | B1* | 6/2002 | Helmer | H04L 67/1095 |
| | | | | 709/217 |
| 6,529,953 | B1 | 3/2003 | Van Renesse | |
| 6,724,770 | B1 | 4/2004 | Van Renesse | |
| 6,888,797 | B1 | 5/2005 | Cao et al. | |
| 7,068,666 | B2 | 6/2006 | Foster et al. | |
| 7,068,667 | B2 | 6/2006 | Foster et al. | |
| 7,124,289 | B1 | 10/2006 | Suorsa | |
| 7,131,123 | B2 | 10/2006 | Suorsa et al. | |
| 7,152,109 | B2 | 12/2006 | Suorsa et al. | |
| 7,251,215 | B1 | 7/2007 | Turner et al. | |
| 7,299,294 | B1 | 11/2007 | Bruck et al. | |
| 7,373,660 | B1 | 5/2008 | Guichard et al. | |
| 7,454,489 | B2* | 11/2008 | Chauffour | H04L 67/1027 |
| | | | | 709/227 |
| 7,461,147 | B1* | 12/2008 | Mowat | H04L 67/1021 |
| | | | | 709/239 |
| 8,204,996 | B2 | 6/2012 | Kim | H04W 4/02 |
| | | | | 709/227 |
| 8,300,641 | B1 | 10/2012 | Vincent et al. | |
| 8,595,378 | B1 | 11/2013 | Cohn et al. | |
| 9,043,463 | B1 | 5/2015 | Cohn et al. | |
| 9,235,535 | B1* | 1/2016 | Shim | G06F 7/08 |
| 9,367,512 | B2* | 6/2016 | Jaudon | G06F 9/452 |
| 9,665,306 | B1* | 5/2017 | Patwardhan | G06F 3/0604 |
| 9,916,545 | B1 | 3/2018 | de Kadt et al. | |
| 10,212,161 | B1 | 2/2019 | Schaefer et al. | |
| 10,218,613 | B2 | 2/2019 | Cohn | |
| 10,225,146 | B2 | 3/2019 | Miller et al. | |
| 10,256,993 | B2 | 4/2019 | Miller et al. | |
| 10,320,644 | B1 | 6/2019 | Chen et al. | |
| 10,361,911 | B2 | 7/2019 | Brandwine et al. | |
| 10,367,753 | B2 | 7/2019 | Schultze et al. | |
| 10,374,949 | B2 | 8/2019 | Miller et al. | |
| 10,389,608 | B2 | 8/2019 | Searle et al. | |
| 10,397,344 | B2 | 8/2019 | Akers et al. | |
| 10,419,287 | B2 | 9/2019 | Miller et al. | |
| 10,484,297 | B1 | 11/2019 | McClenahan | |
| 10,498,693 | B1 | 12/2019 | Strauss et al. | |
| 10,530,657 | B2 | 1/2020 | Brandwine et al. | |
| 10,574,534 | B2 | 2/2020 | Brandwine et al. | |
| 10,593,009 | B1 | 3/2020 | Surani et al. | |
| 10,601,909 | B2 | 3/2020 | Brandwine et al. | |
| 10,644,933 | B2 | 5/2020 | Cohn et al. | |
| 10,728,089 | B2 | 7/2020 | Brandwine et al. | |
| 10,749,808 | B1 | 8/2020 | MacCarthaigh | |
| 10,749,936 | B1 | 8/2020 | Cohn et al. | |
| 10,868,715 | B2 | 12/2020 | Brandwine et al. | |
| 10,911,528 | B2 | 2/2021 | Brandwine et al. | |
| 10,917,322 | B2 | 2/2021 | Russell | |
| 10,951,586 | B2 | 3/2021 | Cohn et al. | |
| 11,089,105 | B1* | 8/2021 | Karumbunathan | G06F 3/065 |
| 11,277,471 | B2 | 3/2022 | Brandwine et al. | |
| 2002/0055972 | A1* | 5/2002 | Weinman, Jr. | G06F 16/00 |
| | | | | 709/217 |
| 2002/0156892 | A1 | 10/2002 | Karger et al. | |
| 2003/0005080 | A1* | 1/2003 | Watkins | H04L 9/40 |
| | | | | 709/219 |
| 2004/0088412 | A1* | 5/2004 | John | H04L 65/612 |
| | | | | 709/231 |
| 2005/0022056 | A1* | 1/2005 | Risi | G06F 11/20 |
| | | | | 714/13 |
| 2005/0114507 | A1 | 5/2005 | Tarai et al. | |
| 2005/0120160 | A1 | 6/2005 | Plouffe et al. | |
| 2005/0193103 | A1 | 9/2005 | Drabik | |
| 2005/0198022 | A1* | 9/2005 | Chang | H04Q 3/54566 |
| 2005/0210010 | A1* | 9/2005 | Larson | G06F 16/2457 |
| 2006/0143517 | A1 | 6/2006 | Douceur et al. | |
| 2006/0184936 | A1 | 8/2006 | Abels et al. | |
| 2007/0078982 | A1* | 4/2007 | Aidun | G06F 11/2035 |
| | | | | 709/225 |
| 2007/0198657 | A1* | 8/2007 | Saliba | G06F 16/1767 |
| | | | | 709/219 |
| 2007/0198710 | A1* | 8/2007 | Gopalakrishnan | |
| | | | | H04L 67/1001 |
| | | | | 709/225 |
| 2007/0239987 | A1 | 10/2007 | Hoole et al. | |
| 2008/0034200 | A1 | 2/2008 | Polcha et al. | |
| 2008/0086483 | A1* | 4/2008 | Park | G06F 16/188 |
| 2008/0153482 | A1* | 6/2008 | Kongalath | H04W 8/06 |
| | | | | 455/432.1 |
| 2008/0200143 | A1* | 8/2008 | Qiu | H04M 11/04 |
| | | | | 455/404.2 |
| 2008/0225875 | A1 | 9/2008 | Wray et al. | |
| 2009/0037998 | A1* | 2/2009 | Adhya | H04L 69/40 |
| | | | | 726/11 |
| 2009/0210455 | A1* | 8/2009 | Sarkar | G06F 11/2038 |
| 2009/0238349 | A1 | 9/2009 | Pezzutti | |
| 2009/0249473 | A1 | 10/2009 | Cohn | |
| 2009/0276771 | A1* | 11/2009 | Nickolov | H04L 67/1008 |
| | | | | 718/1 |
| 2009/0288084 | A1 | 11/2009 | Astete et al. | |
| 2010/0094990 | A1 | 4/2010 | Ben-Yehuda et al. | |
| 2010/0131591 | A1* | 5/2010 | Thomas | H04L 67/01 |
| | | | | 709/203 |
| 2010/0246443 | A1 | 9/2010 | Cohn et al. | |
| 2011/0022694 | A1 | 1/2011 | Dalal et al. | |
| 2011/0044339 | A1* | 2/2011 | Kotalwar | H04L 47/125 |
| | | | | 370/392 |
| 2011/0066592 | A1* | 3/2011 | Newport | G06F 16/273 |
| | | | | 707/615 |
| 2011/0071981 | A1* | 3/2011 | Ghosh | G06F 11/2038 |
| | | | | 707/703 |

(56) References Cited

U.S. PATENT DOCUMENTS

| | | | | |
|---|---|---|---|---|
| 2012/0011398 | A1* | 1/2012 | Eckhardt | G06F 11/2097 714/15 |
| 2013/0179574 | A1* | 7/2013 | Calder | G06F 9/45558 709/226 |
| 2013/0179894 | A1* | 7/2013 | Calder | G06F 9/5027 718/104 |
| 2013/0191831 | A1* | 7/2013 | Goyal | G06F 9/45558 718/100 |
| 2013/0262923 | A1* | 10/2013 | Benson | H04L 41/5096 714/15 |
| 2015/0006948 | A1* | 1/2015 | Yamabiraki | G06F 11/2025 714/4.11 |

OTHER PUBLICATIONS

Kapil Bakshi, "Considerations for Software Defined Networking (SDN): Approaches and Use Cases", AEROSPACE Conference, 2013 IEEE, Mar. 2, 2013, pp. 1-9.

"Chapter: Configuring Layer 2 Services Over MPLS," JUNOSe Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol 2/html/title-swconfig . . . , pp. 357-382, 31 pages.

"Cisco IP Solution Center MPLS VPN Management 4.2," Cisco Systems, Inc., retrieved Jan. 24, 2007, from http://www.cisco.com/en/US/products/sw/netmgtsw/ps5332/products_data_ sheet 09186a008017d7 . . . , 5 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"MPLS-enabled VPN Services," Data Connection, retrieved Jan. 26, 2007, from http://www.dataconnection.com/solutions/vpn_vlan.htm, 1 page.

"Recent Advances Boost System Virtualization," eWeek.com, retrieved May 3, 2006, from http://www.eweek.eom/article2/0,1895,1772626,00.asp, 5 pages.

"Scalable Trust of Next Generation Management (STRONG-MAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 ages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Chown, T., "Use of VLANs for IPv4-IPv6 Coexistence in Enterprise Networks: draft-ietf-v6ops-vlan-usage-01," IPv6 Operations, University of Southampton, Mar. 6, 2006, retrieved Jun. 15, 2007, from http://tools.ietf.org/html/draft-ietf-v6ops-vlan-usage-01, 13 pages.

Coulson, D., "Network Security Iptables," Apr. 2003, Linuxpro, Part 2, retrieved from http://davidcoulson.net/writing/lxf/39/iptables.pdf, 4 pages.

Coulson, D., "Network Security Iptables," Mar. 2003, Linuxpro, Part 1, retrieved from http://davidcoulson.net/writing/lxf/38/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNetNews.com, retrieved May 3, 2006, http://news.zdnet.com/210Q-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Townsley, M., et al., "Encapsulation of MPLS over Layer 2 Tunneling Protocol Version 3: draft-ietf-mpls-over-12tpv3-03.txt," Network Working Group, Nov. 2006, retrieved Jun. 15, 2007, from http://tools.ietf.org/html/draft-ietf-mpls-over-12tpv3-03, 12 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

"Anycast," retrieved on Mar. 16, 2009, from http://en.wikipedia.org/wiki/Anycast, 4 pages.

"Load Balancing (Computing)," retrieved on Mar. 16, 2009, from http://en.wikipedia.org/wiki/Load_balancing_(computing), 5 pages.

"Mobile IP," retrieved on Dec. 19, 2008, from http://en.wikipedia.org/wiki/Mobile_ip, 3 pages.

"Round Robin DNS," retrieved on Dec. 17, 2008, from http://en.wikipedia.org/wiki/Round_robin_DNS, 2 pages.

"Virtual IP Address," retrieved on Dec. 17, 2008, from http://www.answers.com/topic/virtual-ip-address-1, 2 pages.

"VMware VMotion," retrieved on Mar. 16, 2009, from http://www.vmware.com/products/vi/vc/vmotion.html. 2 pages.

"VMWare Storage VMotion," retrieved on Mar. 16, 2009, from http://www.vmware.com/products/vi/storage_vmotion.html. 2 pages.

Clark, C., et al. "Live Migration of Virtual Machines," retrieved on Mar. 16, 2009, from http://www.cl.cam.ac.uk/research/srg/netos/papers/2005-migration-nsdi-pre.pdf, 14 pages.

Roberts, L., "A Radical New Router," Jul. 2009, retrieved Mar. 2, 2010, from http://spectrum.ieee.org/computing/networks/a-radical-new-router/0, 10 pages.

Open Virtualization Format, retrieved on Apr. 21, 2009, from http://www.vmware.com/appliances/learn/ovf.html, 1 page.

The Open Virtual Machine Format—Whitepaper for OVF Specification, v0.9, 2007, retrieved on May 28, 2009, from http://www.vmware.com/pdf/ovf_whitepaper_specification.pdf, 16 pages.

(56) References Cited

OTHER PUBLICATIONS

Open Virtualization Format White Paper, v.1.0.0, Feb. 6, 2009, retrieved on May 28, 2009, from http://www.dmtf.org/standards/published_documents/DSP2017_1.0.0.pdf, 39 pages.

Cohesive Flexible Technologies—VcubeV, retrieved Dec. 9, 2008, from http://www.cohesiveft.com/Developer/, 1 page.

Cohesive Flexible Technologies—VPN-Cubed, retrieved Dec. 9, 2008, from http://www.cohesiveft.com/vpncubed/, 2 pages.

CohesiveFT Elastic Server: VPN-Cubed: Technical Overview, retrieved Dec. 9, 2008, from http://blog.elasticserver.com/2008/12/vpn-cubed-technical-overview.html, 4 pages.

Cohesive Flexible Technologies—CohesiveFT FAQ, retrieved Dec. 9, 2008, from http://www.cohesiveft.com/FAQ/, 10 pages.

Enomalism: Elastic Computing Platform—Virtual Server Management: Home—True Elastic Computing, retrieved Aug. 26, 2008, from http://www.enomalism.com/, 2 pages.

Enomalism: Elastic Computing Platform—Virtual Server Management: Home—Open Source Cloud Computing, retrieved Aug. 26, 2008, from http://www.enomalism.com/, 2 pages.

Cohen, R., "ElasticVapor :: Life in the Cloud—Virtual Private Cloud (VPC)," Thursday, May 8, 2008, retrieved Aug. 26, 2008, from http://elasticvapor.com/search/label/Virtualization, 6 pages.

Internetworking Technology Handbook—Data-Link Switching, retrieved Jul. 22, 2009, from http://cisco.com/en/US/docs/internetworking/technology/handbook/DLSw.html, 7 pages.

Data-Link Switching—Wikipedia, retrieved on May 19, 2009, from http://en.wikipedia.org/wiki/DLSw, 1 page.

Cully, B., et al. "Remus: High Availability via Asynchronous Virtual Machine Replication," retrieved on Mar. 10, 2010, from http://dsg.ca.ubc.ca/remus/papers/remus-nsdi08.pdf, 14 pages.

Remus—Transparent high availability for Xen, retrieved on Mar. 10, 2010, from http://dsg.cs.ubc.ca/remus/, 2 pages.

VMware Fault Tolerance Recommendations and Considerations on VMware vSphere 4, retrieved on Mar. 11, 2010, from http://www.vmware.com/files/pdf/fault_tolerance_recommendations_considerations_on_vmw_vsphere4.pdf, 16 pages.

VMware Fault Tolerance Recommendations and Considerations on VMware vSphere 4—Technical Papers, retrieved on Mar. 11, 2010, from http://www.vmware.com/resources/techresources/10040, 2 pages.

Protecting Mission-Critical Workloads with VMware Fault Tolerance, retrieved on Mar. 11, 2010, http://www.vmware.com/files/pdf/resources/ft_virtualization_wp.pdf, 8 pages.

\* cited by examiner

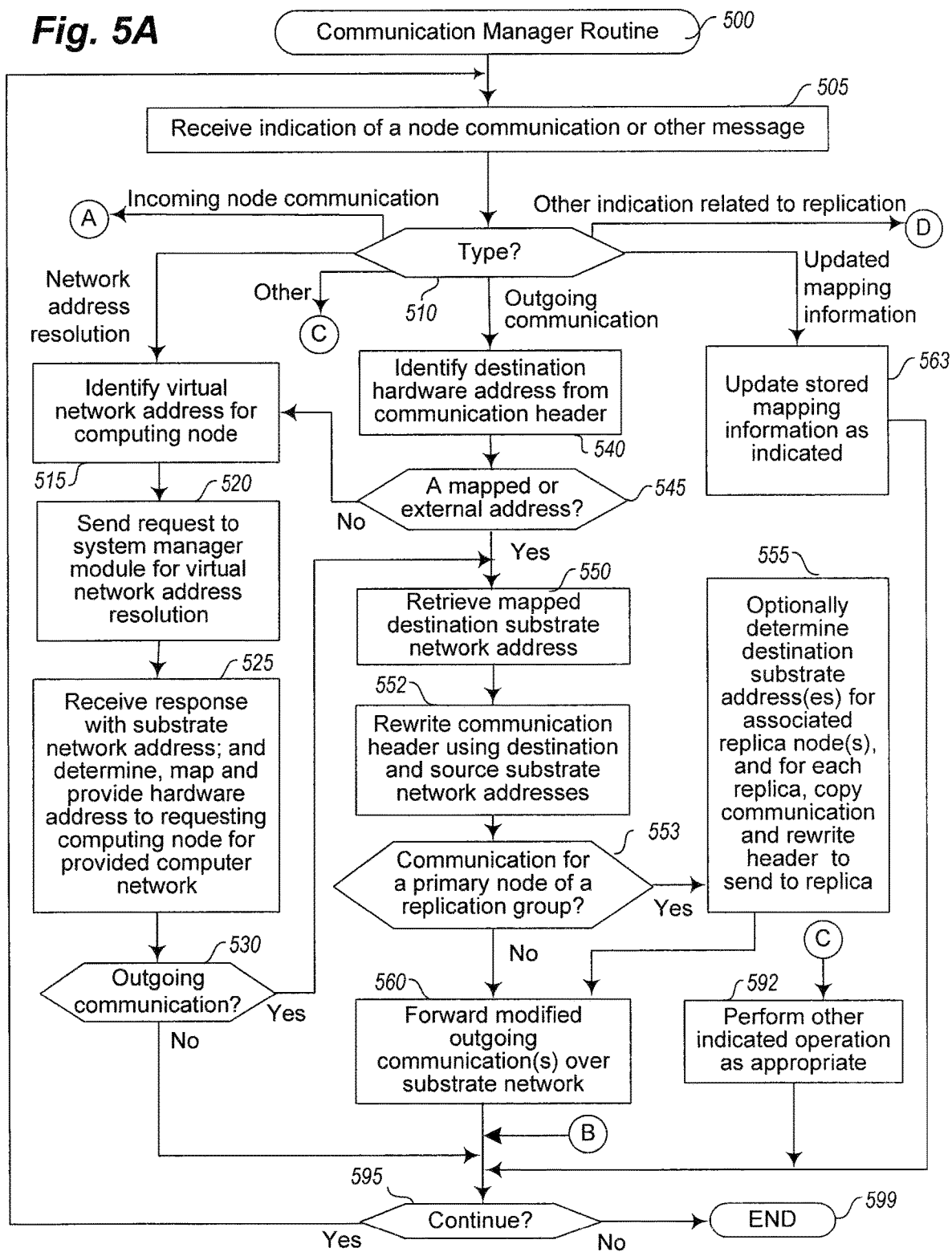

MANAGING REPLICATION OF COMPUTING NODES FOR PROVIDED COMPUTER NETWORKS

This application is a continuation of U.S. patent application Ser. No. 17/163,242, filed Jan. 29, 2021, which is a continuation of U.S. patent application Ser. No. 16/825,871, filed Mar. 20, 2020, now U.S. Pat. No. 10,911,528, which is a continuation of U.S. patent application Ser. No. 15/154,818, filed May 13, 2016, now U.S. Pat. No. 10,601,909, which is a continuation of U.S. patent application Ser. No. 14/629,234, filed Feb. 23, 2015, now U.S. Pat. No. 9,342,412, which is a continuation of U.S. patent application Ser. No. 12/786,310, now U.S. Pat. No. 8,966,027, which are hereby incorporated in reference herein in their entirety.

BACKGROUND

Many companies and other organizations operate computer networks that interconnect numerous computing systems to support their operations, with the computing systems being alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 5A-5C illustrate a flow diagram of an example embodiment of a Communication Manager routine.

DETAILED DESCRIPTION

Figure 1A:
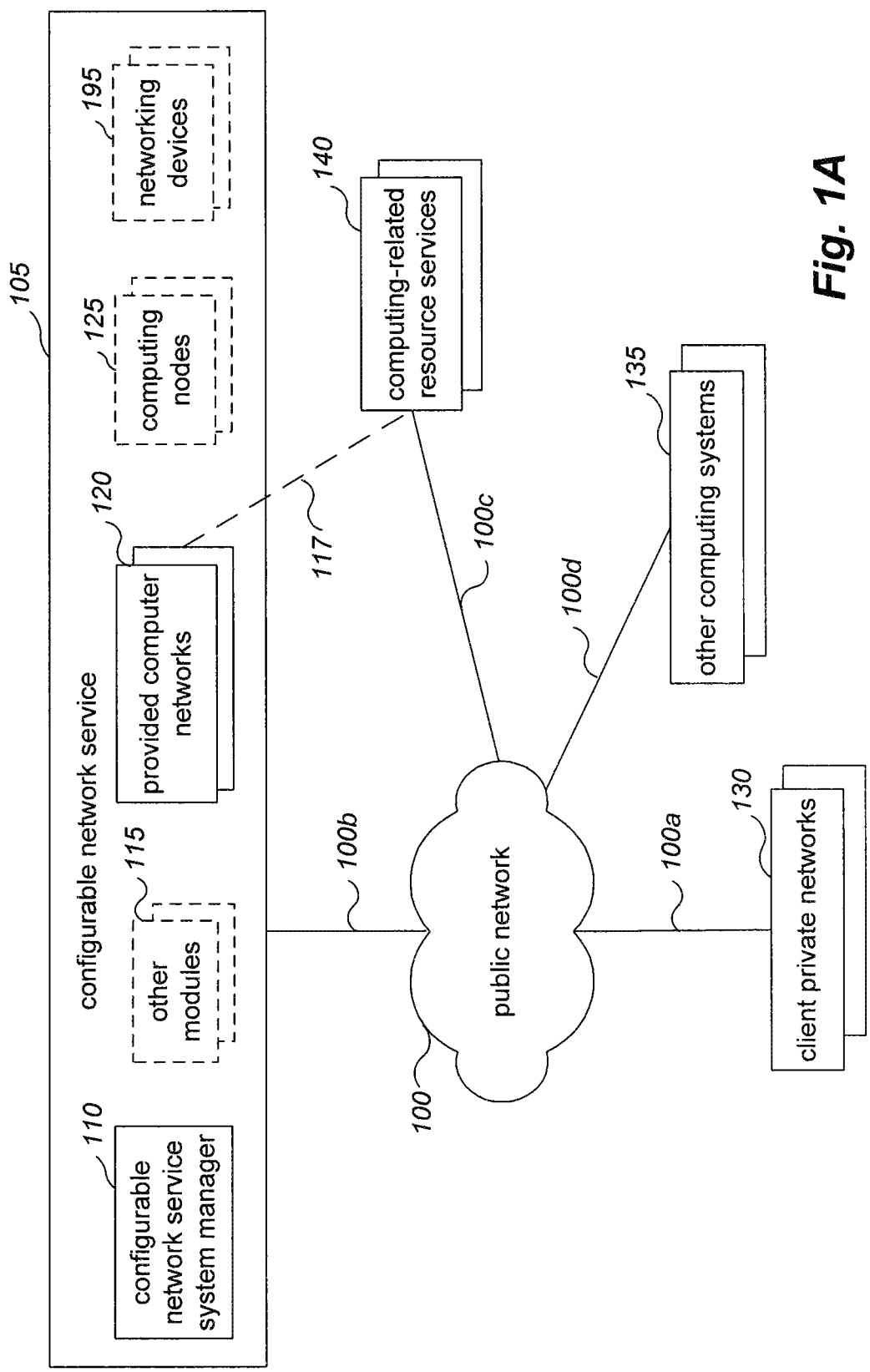
FIGS. 1A and 1B are network diagrams illustrating example embodiments of managing communications for computing nodes belonging to a managed computer network.

Techniques are described for providing managed computer networks, such as for managed computer networks that are each implemented as a virtual computer network overlaid on one or more other underlying computer networks. The managed computer networks may in some embodiments be provided by a configurable network service to users or other entities who are customers (e.g., for a fee) or otherwise clients of the configurable network service, such as to remote clients that access the configurable network service and/or the provided managed computer networks from remote locations over one or more intervening networks (e.g., over the Internet). In at least some embodiments, the techniques include providing capabilities to facilitate replication of a primary computing node that is actively participating in a managed computer network, such as to maintain one or more other computing nodes in the managed computer network as replicated copies of the primary computing node, as well as to manage use of such replicated copy computing nodes in various manners in various situations. For example, a particular managed virtual computer network may span multiple sub-networks ("subnets") or local area networks ("LANs") or other broadcast domains of one or more underlying computer networks, and a particular primary computing node of the managed virtual computer network that is implemented in a first broadcast domain of the underlying computer network may have one or more replicated copy computing nodes that are maintained in other broadcast domains of the underlying computer network that are remote from the first broadcast domain. By maintaining and using mapping information corresponding to the computing nodes of the managed virtual computer network, and in some embodiments by managing access to non-local block data storage for computing nodes, the described techniques enable replicated copy computing nodes that are in remote broadcast domains from a primary computing node being replicated to be used in various manners, including by having such a replicated copy computing node replace its primary computing node within the managed virtual computer network in a manner that is transparent to other computing nodes of the managed virtual computer network, as described in greater detail below. In at least some embodiments, some or all of the described techniques are automatically performed by embodiments of a system manager module and/or one or more communication manager modules, such as modules that are part of a network-accessible configurable network service.

The replication of a primary computing node in a managed virtual computer network may include performing various functionality in various embodiments to maintain one or more other replicated copy computing nodes or other replica computing nodes in the managed virtual computer network, such as to create and maintain a replication group that includes the primary computing nodes and the other replica computing node(s). As will be appreciated, the primary computing node may perform various operations as part of actively participating in the managed virtual computer network, such as may be initiated by one or more software programs executing on the primary computing node, and with some or all such operations optionally being based on responding to communications received from other computing nodes—accordingly, the primary computing node may have an execution state that changes over time. The changing execution state of the primary computing node may include, for example, one or more of a current state of volatile memory of the primary computing node (e.g., RAM, processor registers, etc.), a current state of associated non-volatile storage for the primary computing node (e.g., a local or network-accessible hard disk or other storage device, a remote or other non-local block data storage volume that is mounted and used by the primary computing node in a manner analogous to a local hard disk), etc. The maintaining of a replica computing node for a primary computing node may be performed in various manners and at various times in order to update the execution state of the replica computing node to match or otherwise be consistent with the execution state of the primary computing node, such as by performing one or more of the following: mimicking every action on the replica computing node that is performed by the primary computing node (e.g., every processor instruction, every memory write, every storage write, etc.), including in some embodiments and situations by forwarding a copy to the replica computing node of every communication or other instruction that is sent to the primary computing node; repeatedly updating memory and/or storage on the replica computing node to match or otherwise be consistent with that of the primary computing node, such as periodically (e.g., every second, every minute, every fraction of a second, etc.) and/or upon particular types of actions or events on the primary computing node (e.g., every memory write operation); asynchronously updating the replica computing node to match or otherwise be consistent with the memory and/or storage of the primary computing node, such as upon checkpoints that occur periodically (e.g., every few seconds, every few minutes, etc.) or as initiated by other events; etc. Additional details related to maintaining a replica computing node for a primary computing node are included below.

In addition, replica computing nodes may be used in various manners in various embodiments and situations. In particular, in some embodiments and situations, a replication group with one or more replica computing nodes for a primary computing node may be maintained to enable one or more of the replica computing nodes to take over some or all operations of the primary computing node. For example, if a primary computing node fails or otherwise becomes unavailable, one of the replica computing nodes for the primary computing node may dynamically be selected and promoted to replace the primary computing node, such as in a manner that is transparent to the various other computing nodes in the managed virtual computer network (e.g., with the various other computing nodes interacting with the replica computing node in the same manner as if interacting with the primary computing node, such as by having the replica computing node dynamically take over a virtual network address previously used by the primary computing node). As another example, if the primary computing node is part of a pool of one or more computing nodes that serve as alternatives for providing a particular type of functionality, a replica computing node may be added to the pool to take the place of the primary computing node with respect to providing a portion of that type of functionality, such as to expand the total capabilities of the pool (e.g., to lower the average load on the computing nodes in the pool), including to optionally take over one or more sessions of flows of interaction that the primary computing node was previously managing or handling. In other situations, replica computing nodes may be used in other manners, including to periodically monitor for differences that arise between a primary computing node and a replica computing node, such as to detect and manage transitory errors that may occur on the primary computing node (e.g., errors that arise due to a faulty hardware component of the primary computing node). Additional details related to the use of replica computing nodes are included below.

Furthermore, to enable the maintaining and use of one or more replication groups for a managed virtual computer network that each include a primary computing node and one or more replica computing nodes, the described techniques may include performing various types of monitoring of the primary computing node and/or of the replica computing node(s) for each replication group. For example, as previously noted, in at least some embodiments the managed virtual computer network may be provided by a configurable network service that includes a system manager module and multiple communication manager modules, and if so the monitoring of the replication groups may be performed by one or more of the modules of the configurable network service. A first type of monitoring that may be performed in at least some embodiments and situations includes monitoring the availability of a primary computing node to determine if the primary computing node fails or otherwise becomes unavailable (e.g., so as to initiate the automated replacement of the primary computing node with one of its replica computing nodes, such as with one of the replica computing nodes that is automatically and dynamically selected) and/or monitoring the load on or other status of the primary computing node (e.g., so as to determine whether to automatically initiate the use of one or more replica computing nodes for scaling purposes, such as with respect to a pool of alternative computing nodes to which the primary computing node belongs). A second type of monitoring that may be performed in at least some embodiments and situations includes monitoring changes to the execution state of a primary computing node to determine whether and when to update replica computing nodes to reflect the primary computing node, such as if updating operations are performed upon the occurrence of particular types of changes to primary computing nodes or upon the occurrence of other types of events. A third type of monitoring that may be performed in at least some embodiments and situations includes monitoring the status of the replica computing nodes of a replication group, such as to determine if a replica computing node fails or otherwise becomes unavailable (e.g., so as to determine whether to automatically initiate the automated replacement of the replica computing node with another existing computing node of the managed virtual computer network or with a new computing node added to the managed virtual computer network). A fourth type of monitoring that may be performed in at least some embodiments relates to tracking one or more types of actions taken for or on behalf of one or more computing nodes of a replication group, such as to enable fee-based metering for such actions. Additional details related to monitoring activities that may be performed for replication groups are included below.

As previously noted, in at least some embodiments, the described techniques may enable a replica computing node to be maintained for a primary computing node regardless of the size of the underlying computer network or of the physical location of the replica computing node in the underlying computer network with respect to the location of the primary computing node being replicated. Thus, for example, a primary computing node of a managed virtual computer network may be provided on a first underlying physical network located in a first geographical location and/or as part of a first LAN or VLAN ("Virtual LAN") or other broadcast domain of the underlying computer network for the managed virtual computer network, while the replica computing node may be provided on a second underlying physical network located in a distinct second geographical location that is remote from the first geographical location and/or as part of a distinct second LAN or VLAN or other broadcast domain of the underlying computer network for the managed virtual computer network. Furthermore, the actions of the modules of a configurable network service that provides the managed virtual computer network may further enable the primary computing node to be located at any position in the underlying computer network, regardless of any logical network topology specified for the managed virtual computer network, and may similarly enable a replica computing node to dynamically replace a primary computing node despite the differing locations of the replica and primary computing nodes in the underlying network, such as without problems that exist in the prior art regarding the use of spanning tree protocols and other factors that restrict hot swap replacement computer system copies to a common broadcast domain of a physical network to allow network convergence to occur to the replacement after a change.

As noted above, in at least some embodiments, the described techniques include managing communications for a managed computer network being provided, including in embodiments in which the managed computer network is a virtual computer network that is overlaid on one or more underlying substrate computer networks. In such embodiments, communications may be encoded in various manners before being sent over an underlying substrate network (e.g., to use substrate network addresses for the communication source and/or final destination in the encoded communication that are distinct from virtual network addresses used for the communication source and/or final destination in the original pre-encoded communication), and the described techniques to facilitate replication and the use of replica computing nodes may be used in conjunction with such encoded communications, as discussed in greater detail below. Before discussing some additional details of managing such communications in particular manners, however, some aspects of such managed computer networks in at least some embodiments are introduced.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the existence and use of the intermediate physical network(s) being transparent to the computing nodes (e.g., with the computing nodes being unaware of and/or being unable to detect the intermediate physical networks) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is being provided on behalf of a user or other entity and that is a virtual computer network overlaid on a substrate network, each computing node may be assigned one or more virtual network addresses for the provided virtual computer network that are unrelated to those computing nodes' substrate network addresses, such as from a range of virtual network addresses used for the provided virtual computer network—in at least some embodiments and situations, the virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the logical edge of the intermediate physical network(s), by modifying the communications that enter the intermediate physical network(s) to encode the communications for the intermediate physical networks (e.g., to use substrate network addresses that are based on the networking protocol of the substrate network), and by modifying the communications that leave the intermediate physical network(s) to decode the communications (e.g., to use virtual network addresses that are based on the networking protocol of the virtual computer network). Additional details related to the provision of such an overlay virtual computer network are included below.

In at least some embodiments, a network-accessible configurable network service ("CNS") is provided by a corresponding CNS system, and the CNS system provides managed overlay virtual computer networks to remote customers (e.g., users and other entities), such as by providing and using numerous computing nodes that are in one or more geographical locations (e.g., in one or more data centers) and that are inter-connected via one or more intermediate physical networks. The CNS system may use various communication manager modules at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules to manage communications for the overlay virtual computer networks being provided, the CNS system may track and use various information about the computing nodes of each virtual computer network being managed, such as to map the substrate physical network address of each such computing node to the one or more overlay virtual network addresses associated with the computing node. Such mapping and other information may be stored and propagated in various manners in various embodiments, including centrally or in a distributed manner, as discussed in greater detail below.

Furthermore, in order to provide managed virtual computer networks to users and other entities in a desired manner, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes may include, for example, one or more of the following non-exclusive list: a quantity of the multiple computing nodes to include as part of the virtual computer network; one or more particular computing nodes to include as part of the virtual computer network; a range or other group of multiple virtual network addresses to associate with the multiple computing nodes of the virtual computer network; particular virtual network addresses to associate with particular computing nodes or particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; network topology information for the virtual computer network, such as to specify logical subnets and/or other logical topology of the virtual computer network; information regarding one or more computing nodes of a managed virtual computer network to be replicated, such by specifying a particular one or more computing nodes to be replicated, or instead in other manners (e.g., by specifying a particular level of availability or fault-tolerance for a particular one or more computing nodes that is enabled by the use of one or more replicated copy computing nodes for each of those particular computing nodes); etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks, such as virtual computer networks that are created and configured as network extensions to existing remote private computer networks of clients, although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network; to dynamically modify the provided computer network while it is in use, to configure and use replicated computing nodes in the provided computer network, etc.

In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In the example of FIG. 1A, a number of clients interact over the public network 100 with a system manager module 110 of the CNS 105 to create and configure various managed computer networks 120 being provided by the CNS 105, with at least some of the provided computer networks 120 optionally being private computer network extensions to remote existing client private networks 130, and with at least some such of those provided computer network extensions 120 being configured to enable access from one or more corresponding client private networks 130 over the public network 100 (e.g., private access via VPN connections established over interconnections 100a and 100b, or access via other types of private or non-private interconnections). In this example embodiment, the system manager module 110 assists in providing functionality of the CNS 105 to the remote clients, such as in conjunction with various optional other modules 115 of the CNS 105 (e.g., various communication manager modules), and in conjunction with various optional computing nodes 125 and/or networking devices 195 (e.g., substrate network router devices, edge devices, etc.) that are used by the CNS 105 to provide the managed computer networks 120. In at least some embodiments, the CNS system manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices (not shown) of a client. In the illustrated example, the provided computer networks 120 each include multiple computing nodes (not shown), at least some of which may be from the plurality of optional computing nodes 125 provided by or otherwise under the control of the CNS 105, while in other embodiments at least some other computing systems 135 may be used to provide some or all computing nodes for one or more of the provided computer networks 120—such other computing systems 135 may, for example, be provided by or under control of the client for whom a computer network 120 that uses those other computing systems 135 is provided, or may be computing systems that are provided by third parties (e.g., for a fee). Each of the provided computer networks 120 may be configured in various ways by the clients for whom they are provided, and may each be a private computer network that is accessible only by the client that creates it, although in other embodiments at least some computer networks provided by the CNS 105 for clients may be publicly accessible. Similarly, while at least some of the provided computer networks 120 in the example may be extensions to remote client computer networks 130 that are private networks, in other embodiments the provided computer networks 120 may be stand-alone computer networks that are not extensions to other existing computer networks 130 and/or may be extensions to other client computer networks 130 that are not private networks.

Private access between a remote client private computer network 130 and a corresponding private computer network extension 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other network devices to enable VPN access to a particular private network extension 120 of a client, such as by automatically configuring one or more VPN mechanisms hosted by the CNS 105 (e.g., software and/or hardware VPN mechanisms, including a software VPN endpoint that is provided by one of the multiple computing nodes of the provided network extension 120), and/or may automatically provide appropriate configuration information to the client (e.g., credentials, access points, and/or other parameters) to allow a VPN mechanism hosted on the remote client private network 130 to establish the VPN access. After VPN access has been appropriately enabled and/or configured, a VPN connection may be established between the remote client private network and the provided private network extension, such as initiated by the client using IPsec ("Internet Protocol Security") or other appropriate communication technologies, or instead a VPN connection or other private connection may be established to or between networks that use MPLS ("Multi Protocol Label Switching") for data transmission. In addition, in the illustrated example, various network-accessible remote resource services 140 may optionally be available to remote computing systems over the public network 100, including to computing nodes on the remote client private networks 130. The resource services 140 may provide various functionality to the remote computing nodes, such as for at least some of the resource services 140 to provide remote computing nodes with access to various types of network-accessible computing-related resources (e.g., long-term storage capabilities, such as block storage that is mountable by particular computing nodes of the provided computer networks 120, storage that is otherwise network-accessible from particular remote computing nodes of the provided computer networks 120 using API calls, etc.). Additional details related to one example embodiment of providing access to remote network-accessible block storage that is mountable by particular computing nodes of a provided computer network with which the described techniques may be used are available in U.S. application Ser. No. 12/188,943, filed Aug. 8, 2008 and entitled "Providing Executing Programs With Reliable Access to Non-Local Block Data Storage," which is hereby incorporated by reference in its entirety. Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 117 that are part of the provided computer networks 120, although the actual communications with the remote resource services 140 may occur over the public networks 100 (e.g., via interconnections 100b and 100c). In addition, in at least some embodiments, multiple distinct provided computer networks 120 may be configured to enable inter-access with each other.

The provided computer networks 120 may each be configured by clients in various manners. For example, in at least some embodiments, the CNS 105 provides various computing nodes 125 that are available for use with computer networks provided to clients, such that each provided computer network 120 may include a client-configured quantity of multiple such computing nodes that are dedicated for use as part of that provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. Furthermore, in at least some embodiments, a client may interact with the module 110 to configure network topology information for a computer network provided for the client (e.g., via one or more programmatic interactions with an API provided by the CNS 105), and such network topology information may later be dynamically modified for a provided computer network in at least some such embodiments, such as after the provided computer network has already been in use by the client. Moreover, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client. In addition, in at least some embodiments, a client may interact with the module 110 to configure the provision and use of functionality related to replication groups or other replication functionality for one or more computing nodes of a provided computer network (e.g., via one or more programmatic interactions with an API provided by the CNS 105).

Network addresses may be configured for a provided computer network in various manners in various embodiments. For example, the client may specify one or more address ranges (e.g., a Classless Inter-Domain Routing ("CIDR") address block) or other groups of network addresses for the provided computer network, such that at least some of the specified network addresses are used for the computing nodes of the provided computer network, and with those specified network addresses optionally being a subset of network addresses used by an existing remote client computer network if the provided computer network is configured to be an extension to the remote client computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be external public network addresses that are directly addressable from computing systems on the public network 100 (e.g., a public network address that is a static Internet-routable IP address or other non-changing network address). In other embodiments, the CNS 105 may automatically select network addresses to be used for at least some computing nodes of at least some provided computer networks, such as based on network addresses that are available for use by the CNS 105, based on selecting network addresses that are related to network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network (not shown) of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing node(s), and if so, the associated communication manager module for a computing node may take various actions to emulate desired functionality of a network with respect to that computing node, as discussed in greater detail elsewhere. As one specific example, a particular virtual computer network may be configured to include a pool of multiple alternative computing nodes that are co-located in the specified network topology for the virtual computer network, but the actual alternative computing nodes may be widely separated in the underlying substrate network (e.g., in different data centers or other geographical locations, such as to improve fault tolerance and reliability, and/or to improve network latency by selecting a physically nearby alternative computing node, such as based on use of an anycast protocol).

Network access constraint information may also be configured for a provided computer network in various manners in various embodiments. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes of the managed computer networks may be physical computing systems and/or may be virtual machines that are each hosted on one or more physical computing systems, and the communications that are handled for managed computer networks may include transmissions of data (e.g., messages, packets, frames, streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks, while in other embodiments the communications are encoded in other manners (e.g., by storing virtual network address information from the pre-encoded communication in one or more header fields of the encoded communication or otherwise in a manner associated with the encoded communications, such as if the overlay virtual computer network and underlying substrate network use the same networking protocol). As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by reheadering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, Internet Engineering Task Force ("IETF"), which is hereby incorporated by reference in its entirety. This document is also available at the time of filing at tools<dot>ietf<dot>org<slash>html<slash>rfc2765 (where <dot> and <slash> are replaced by the corresponding characters with those names, "." and "/", respectively).

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations, and without regard to constraints that arise from traditional network routing protocols (e.g., spanning tree protocols).

At least some such benefits may similarly apply for logical subnets that are specified for such a particular provided virtual computer network, with the substrate network functionality used to emulate various functionality corresponding to the specified logical subnets. For example, the use of the underlying substrate network may enable different computing nodes assigned to a particular logical subnet to be located at any position within the substrate network, with the substrate network forwarding communications to destination computing nodes based on those destination computing nodes' substrate network addresses, and similarly may allow a particular computing node to be dynamically moved from any location in the substrate network to any other substrate network, regardless of any broadcast domains or local area networks or other physical constraints of the substrate network. As such, the substrate network may support specified logical subnets or other configured network topology for a managed computer network, without any configuration for or other use of information about such specified logical subnets, and with the CNS system modules (e.g., communication manager modules) instead managing the corresponding functionality from the logical edges of the substrate network where the CNS system modules connect to the substrate network.

For illustrative purposes, some embodiments are described below in which specific types of computing nodes, networks, communications, network topologies, and configuration operations are performed. These examples are provided for illustrative purposes and are simplified for the sake of brevity, and the inventive techniques may be used in a wide variety of other situations, some of which are discussed below.

Figure 1B:
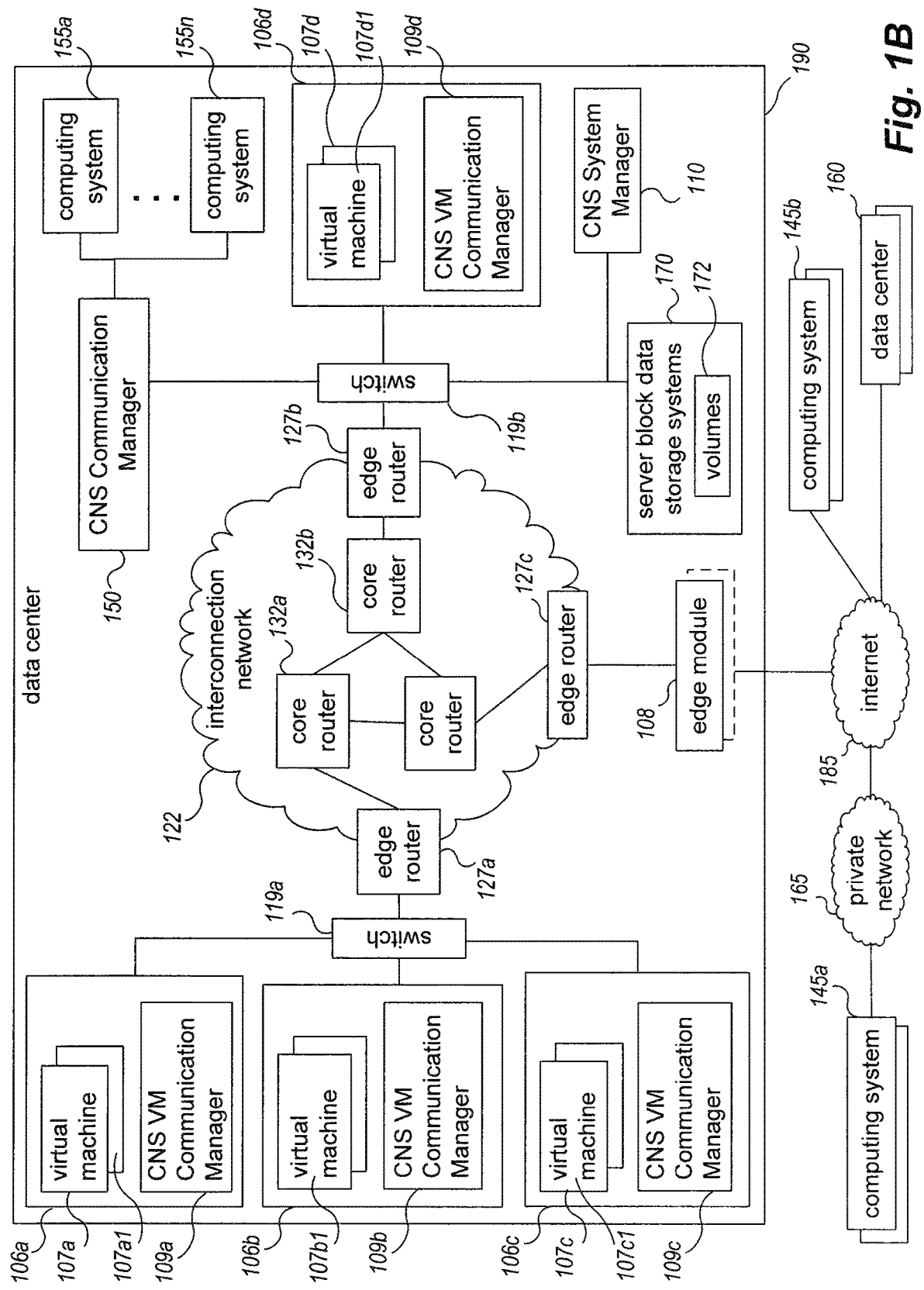

FIG. 1B is a network diagram illustrating an example embodiment of configuring and managing communications between computing nodes belonging to a virtual computer network, by overlaying the virtual computer network and the communications on one or more intermediate physical networks in a manner transparent to the computing nodes of the virtual computer network. In this example, the configuring and managing of the communications is facilitated by a system manager module and multiple communication manager modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 190 with multiple physical computing systems operated on behalf of the CNS system. The example data center 190 is connected to an internet 185 external to the data center 190, which provides access to one or more computing systems 145a via private network 165, to one or more other globally accessible data centers 160 that each have multiple computing systems (not shown), and to one or more other computing systems 145b. The Internet 185 may be, for example, a publicly accessible network of networks (possibly operated by various distinct parties), such as the Internet, and the private network 165 may be, for example, a corporate network that is wholly or partially inaccessible from computing systems external to the private network 165. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 190 includes a number of physical computing systems 106a-106d and 155a-155n, as well as a Communication Manager module 150 that executes on one or more other computing systems or devices (not shown) to manage communications for the associated computing systems 155a-155n, and a System Manager module 110 that executes on one or more computing systems (not shown). In this example, each physical computing system 106a-106d hosts multiple virtual machine computing nodes and includes an associated virtual machine ("VM") communication manager module (e.g., as part of a virtual machine hypervisor monitor for the physical computing system), such as VM Communication Manager module 109a and multiple virtual machines 107a on host computing system 106a, and such as VM Communication Manager module 109d and multiple virtual machines 107d on host computing system 106d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may be implemented as part of various types of devices separate from the physical computing systems 155a-155n, such as, for example, a proxy computing device, a firewall device, or a networking device (e.g., a switch, router, hub, etc.) through which communications to and from the physical computing systems travel. In other embodiments, all or none of the physical computing systems at the data center may host virtual machines.

This example data center 190 further includes multiple physical networking devices, such as switches 119a-119b, edge router devices 127a-127c, and core router devices 132a-132c. Switch 119a is part of a physical sub-network that includes physical computing systems 106a-106c, and is connected to edge router 127a. Switch 119b is part of a distinct physical sub-network that includes physical computing systems 106d and 155a-155n, as well as the computing systems providing the Communication Manager module 150 and the System Manager module 110, and is connected to edge router 127b. The physical sub-networks established by switches 119a-119b, in turn, are connected to each other and other networks (e.g., the internet 185) via an intermediate interconnection network 122, which includes the edge routers 127a-127c and the core routers 132a-132c. The edge routers 127a-127c provide gateways between two or more physical sub-networks or networks. For example, edge router 127a provides a gateway between the physical sub-network established by switch 119a and the interconnection network 122, while edge router 127c provides a gateway between the interconnection network 122 and internet 185 (e.g., via the edge modules 108). The core routers 132a-132c manage communications within the interconnection network 122, such as by routing or otherwise forwarding packets or other data transmissions as appropriate based on characteristics of such data transmissions (e.g., header information including source and/or destination addresses, protocol identifiers, etc.) and/or the characteristics of the interconnection network 122 itself (e.g., routes based on the physical network topology, etc.). In addition, in this example, the one or more alternative edge modules 108 manage communications between computing nodes at the data center 190 and other external computer systems (e.g., computing systems 145a, computing systems 145b, computing systems at other data centers 160, etc.), such as in a manner analogous to a communication manager module (e.g., by decoding at least some communications that are leaving the data center 190 and that have been encoded for the substrate network at the data center 190, and/or by encoding at least some communications that are entering the data center 190 for use with the substrate network at the data center 190).

The illustrated System Manager module and Communication Manager modules may perform at least some of the described techniques in order to configure, authorize and otherwise manage communications sent to and from associated computing nodes, including to support providing various virtual networking functionality for one or more virtual computer networks that are provided using various of the computing nodes, to support providing various emulated functionality for one or more virtual networking devices that are configured for one or more such provided virtual computer networks, and/or to support providing various types of functionality related to replication of computing nodes of provided computer networks. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay one or more particular virtual networks over one or more intermediate physical networks that are used as a substrate network, such as over the interconnection network 122. Furthermore, a particular virtual computer network may optionally be extended beyond the data center 190 in some embodiments, such as if one or more other data centers 160 also provide computing nodes that are available for use by the example CNS system, and the particular virtual network includes computing nodes at two or more such data centers at two or more distinct geographical locations. Multiple such data centers or other geographical locations of one or more computing nodes may be inter-connected in various manners, including the following: directly via one or more public networks in a non-private manner, or via a private connection, not shown (e.g., a dedicated physical connection that is not shared with any third parties, such as a leased line; or a VPN or other mechanism that provides the private connection over a public network); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 190 in other manners in other embodiments, such as if one or more other Communication Manager modules at the data center 100 are positioned between edge router 127c and the global Internet 135 (e.g., if the edge modules 108 each provide at least some of the functionality of a Communication Manager module in encoding and decoding communications for virtual computer networks to use the underlying substrate network 122), or instead based on one or more other Communication Manager modules external to the data center 190 (e.g., if another Communication Manager module, not shown, is made part of private network 165, so as to manage communications for computing systems 145a over the internet 185 and private network 165). Thus, for example, if an organization operating private network 165 desires to virtually extend its private computer network 165 to one or more of the computing nodes of the data center 190, it may do so by implementing one or more Communication Manager modules as part of the private network 165 (e.g., as part of the interface between the private network 165 and the internet 185)—in this manner, computing systems 145a within the private network 165 may communicate with those data center computing nodes as if those data center computing nodes were part of the private network. In other embodiments, the private computer network 165 may instead be extended to one or more computing nodes of the data center 190 by the edge modules 108 of the data center 190 managing the communications between computing nodes of the private network 165 and particular data center 190 computing nodes.

Thus, as one illustrative example, one of the virtual machine computing nodes 107a on computing system 106a (in this example, virtual machine computing node 107a1) may be part of the same provided virtual computer network as one of the virtual machine computing nodes 107d on computing system 106d (in this example, virtual machine computing node 107d1), and may further both be assigned to a specified logical subnet of that virtual computer network that includes a subset of the computing nodes for that virtual computer network, such as with the IPv4 networking protocol being used to represent the virtual network addresses for the virtual computer network. The virtual machine 107a1 may then direct an outgoing communication (not shown) to the destination virtual machine computing node 107d1, such as by specifying a virtual network address for that destination virtual machine computing node (e.g., a virtual network address that is unique for the local broadcast domain of the specified logical subnet). The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual computer networks and/or entities with which the computing nodes are associated, information about any specified logical subnets to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

Figure 2A:
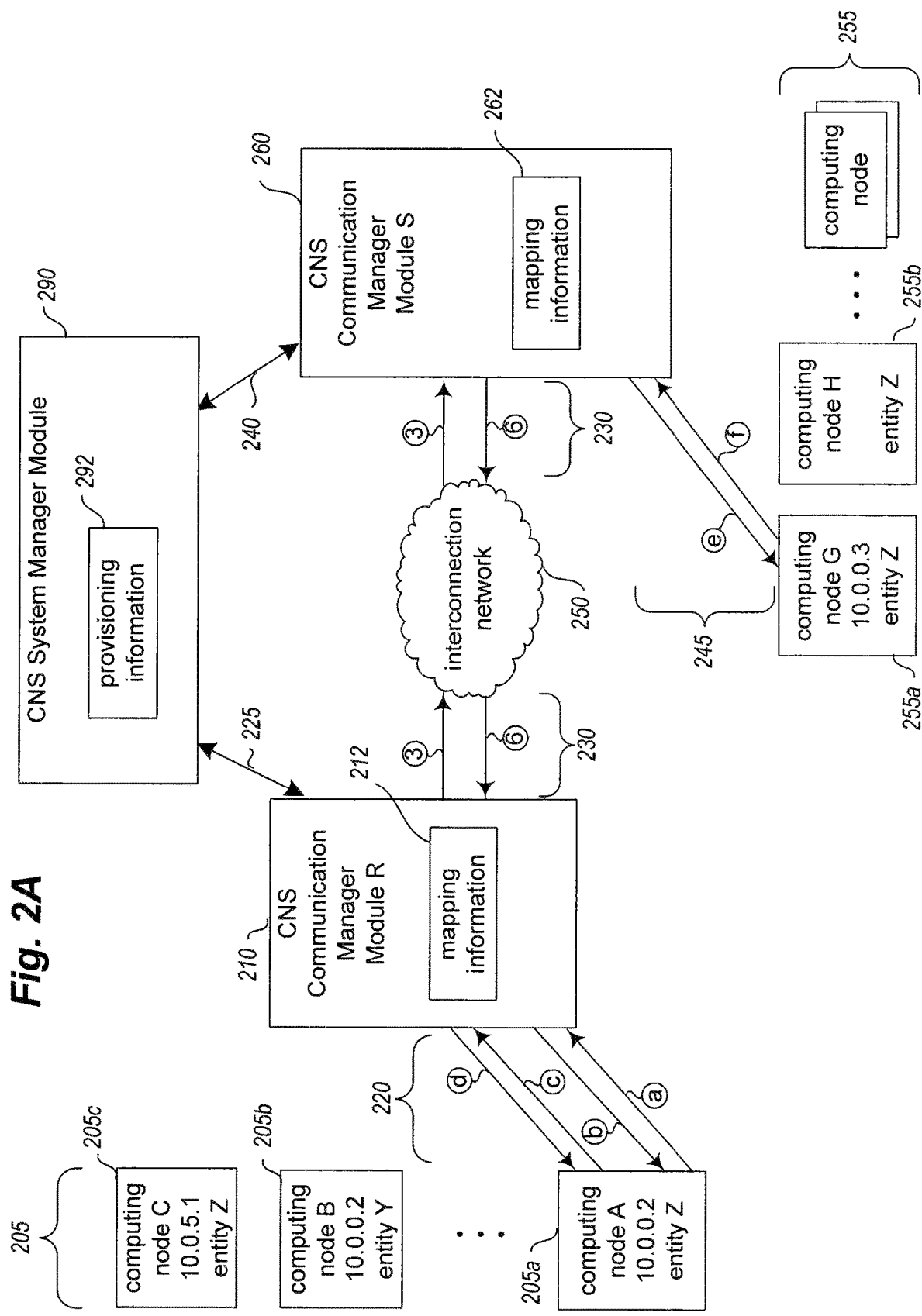
FIGS. 2A-2E illustrate examples of managing communications between computing nodes of a managed virtual overlay computer network and facilitating replication of such computing nodes.
Figure 2B:
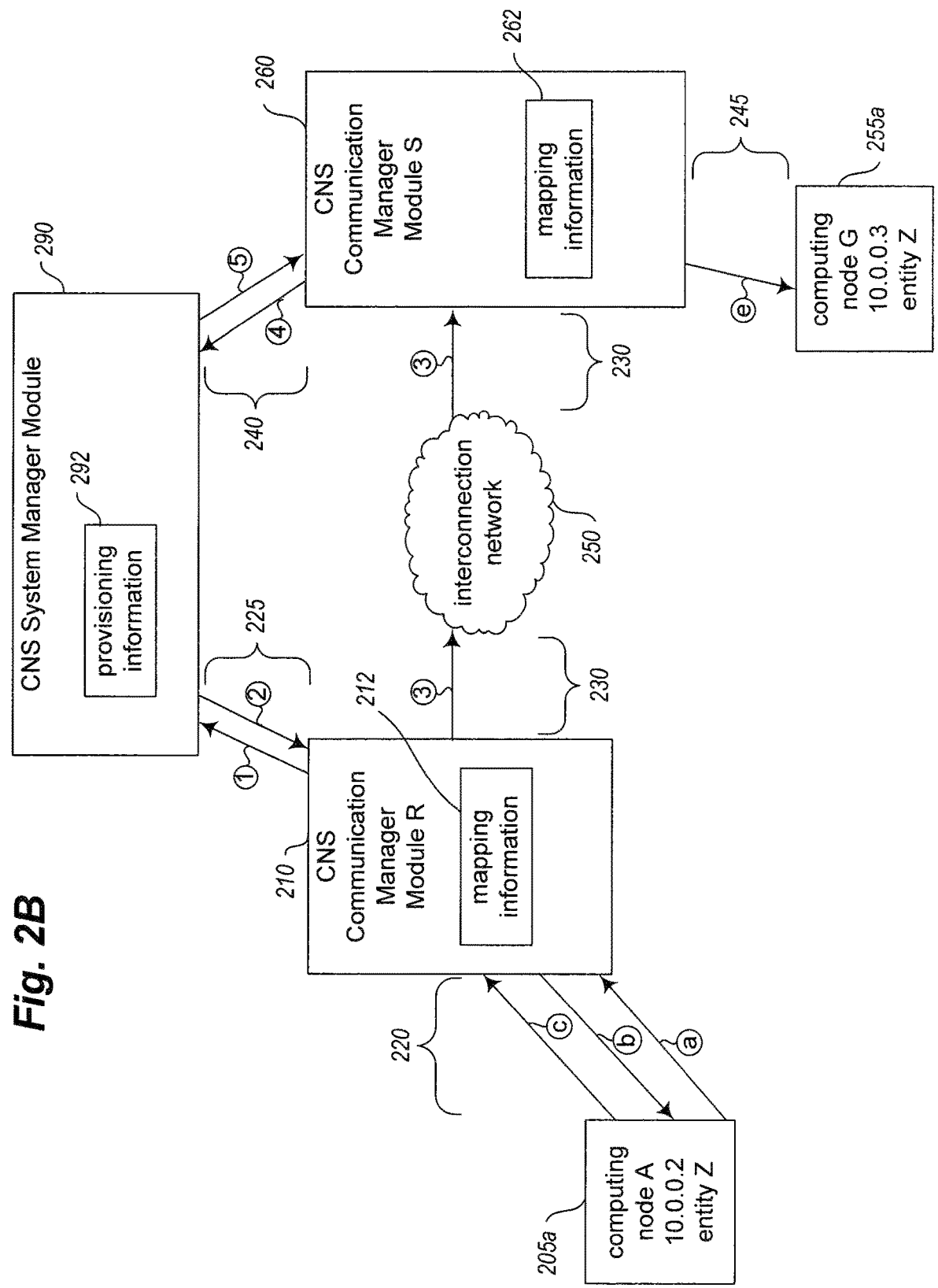

If the Communication Manager module 109a determines that the outgoing communication is authorized (or does not perform such an authorization determination), the module 109a determines the actual physical network location corresponding to the destination virtual network address for the communication. For example, the Communication Manager module 109a may determine the actual destination network address to use for the virtual network address of the destination virtual machine 107d1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). The Communication Manager module 109a then reheaders or otherwise modifies the outgoing communication so that it is directed to Communication Manager module 109d using an actual substrate network address, such as if Communication Manager module 109d is associated with a range of multiple such actual substrate network addresses. FIGS. 2A-2B provide examples of doing such communication management in some embodiments.

When Communication Manager module 109d receives the communication via the interconnection network 122 in this example, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2B. If the communication is determined to be authorized (or the Communication Manager module 109d does not perform such an authorization determination), the Communication Manager module 109d then reheaders or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards or otherwise provides the modified communication to the destination virtual machine computing node 107d1, such as via shared memory (not shown) of the computing system 106d that is used to provide a logical network interface for the destination virtual machine computing node 107d1. In at least some embodiments, before forwarding the incoming communication to the destination virtual machine, the Communication Manager module 109d may also perform additional steps related to security, as discussed in greater detail elsewhere.

In addition, while not illustrated in FIG. 1B, in some embodiments the various Communication Manager modules may take further actions to provide virtual networking functionality corresponding to a specified network topology for the provided virtual computer network (e.g., for one or more virtual networking devices for the provided virtual computer network), such as by managing communications between computing nodes of the provided virtual computer network in specified manners and by responding to other types of requests sent by computing nodes of the virtual computer network. For example, although being separated from computing node 107a1 on physical computing system 106a by the interconnection network 122 in the example embodiment of FIG. 1B, virtual machine computing node 107d1 on physical computing system 106d may be configured to be part of the same logical sub-network of the virtual computer network as computing node 107a1 (e.g., to not be separated by any logical router devices specified for the provided virtual computer network). Conversely, despite the physical proximity of virtual machine computing node 107c1 on physical computing system 106c to virtual machine computing node 107a1 on physical computing system 106a (i.e., being part of the same physical sub-network without any intervening physical substrate router devices) in the example embodiment of FIG. 1B, computing node 107c1 may be configured to be part of a distinct logical sub-network of the virtual computer network from that of computing node 107a1 (e.g., may be configured to be separated by one or more specified router devices of the provided virtual computer network, not shown, which in this example are virtual router devices that are not physically provided for the virtual computer network). If computing nodes 107a1 and 107d1 are configured to be part of the same logical sub-network, the previous example of sending a communication from computing node 107a1 to computing node 107d1 may be performed in the manner previously described, without emulating the actions of any intervening virtual router devices (despite the use of multiple physical router devices in the substrate interconnection network 122 for forwarding the communication), since computing nodes 107a1 and 107d1 are configured to be part of single sub-network in the specified network topology.

However, if computing node 107a1 sends an additional communication to computing node 107c1, the Communication Manager modules 109a and/or 109c on the host computing systems 106a and 106c may perform additional actions that correspond to one or more virtual specified router devices configured in the specified network topology for the provided virtual computer network to separate the computing nodes 107a1 and 107c1. For example, the source computing node 107a1 may send the additional communication in such a manner as to initially direct it to a first of the virtual specified router devices that is configured to be local to computing node 107a1 (e.g., by including a virtual hardware address in the header of the additional communication that corresponds to that first virtual specified router device), with that first virtual specified router device being expected to forward the additional communication on toward the destination computing node 107c1 via the specified logical network topology. If so, the source Communication Manager module 109a may detect that forwarding of the additional communication to the virtual first router device (e.g., based on the virtual hardware address used in the header of the additional communication), or otherwise be aware of the configured network topology for the virtual computer network, and may take actions to emulate functionality of some or all of the virtual specified router devices that are configured in the specified network topology to separate the computing nodes 107a1 and 107c1. For example, each virtual router device that forwards the additional communication may be expected to take actions such as modifying a TTL ("time to live") hop value for the communication, modify a virtual destination hardware address that is specified for the communication to indicate the next intended destination of the additional communication on a route to the destination computing node, and/or otherwise modify the communication header. If so, the source Communication Manager module 109a may perform some or all of those actions before forwarding the additional communication directly to the destination Communication Manager module 109c over the substrate network (in this case, via physical switch device 119a) for provision to destination computing node 107c1. Alternatively, some or all such additional actions to provide the virtual networking functionality for the sent additional communication may instead be performed by the destination Communication Manager module 109c after the additional communication is forwarded to the Communication Manager module 109c by the Communication Manager module 109a.

Furthermore, as part of the prior continuing example, computing node 107a1 may determine to send a third communication to a final destination computer system external to the data center, such as to a particular computing system 145a (e.g., with the particular computing system 145a not being part of the virtual computer network to which computing node 107a1 belongs). In this situation, the Communication Manager module 109a on the host computing system 106a that is associated with the source computing node 107a1 may further perform additional actions to support the use of an intermediate destination for the communication. In particular, in this example, the various edge modules 108 may be a pool of multiple alternative computing nodes that provide edge module functionality in a manner analogous to an edge device, and may be optionally managed by a load balancer device (not shown). Thus, the Communication Manager module 109a determines that the final destination computing system 145a is external to the data center 190, and encodes the outgoing communication from the source computing node 107a1 for forwarding over the substrate network 122 from the host computing system 106a to one of the edge modules 108. The selected intermediate destination edge module 108 may then handle the encoded communication in a typical manner, such as by optionally decoding the communication, and forwarding the communication over the internet 185 to the final destination computing system 145a.

In addition, as a further continuation of the prior example, one of the computing nodes of the managed virtual computer network may be designated as a primary computing node to be replicated for the managed virtual computer network, such as by specifying a replication group that includes that primary computing node—for the purposes of this continuing example, virtual machine computing node 107d1 is designated as the primary computing node. Accordingly, one or more other computing nodes of the managed virtual computer network may be selected to be used as replica computing nodes for computing node 107d1, such as by being included in the replication group—in this example, one of the virtual machine computing nodes of physical computing system 106b is selected as such a replica computing node, with the particular replica computing node being computing node 106b1, although in other embodiments one or more other replica computing nodes may be used (e.g., one of the computing systems 155a-155n; a computing node that is external to the data center 190, such as a computing node provided by one of the data centers 160; etc.). Thus, despite being separated from computing node 107d1 on physical computing system 106d by the interconnection network 122 in the example embodiment of FIG. 1B, such as to be part of distinct broadcast domains of the underlying computer network, virtual machine computing node 107b1 on physical computing system 106b may be configured to be a replica computing node for computing node 107d1, and may further later be transparently used to replace computing node 107d1 while the managed virtual computer network is in use. The actual replication of the primary computing node 107d1 on the replica computing node 107b1 may be performed in various manners, as discussed in greater detail elsewhere, including by exchanging various communications between a location of the primary computing node 107d1 (e.g., as initiated by the primary computing node or by the associated Communication Manager module 109d) and the location of each of one or more replica computing nodes (e.g., to be received by Communication Manager module 109b that is associated with replica computing node 107b1). Such communications to replica computing nodes to enable the replication to be maintained may in some embodiments be validated by the receiving Communication Manager module and/or the receiving replica computing node, such as in a manner similar to that discussed above and elsewhere for verifying that encoded communications received over the substrate network are authorized and/or valid, and/or to verify that the communications are being received from the primary computing node of the replication group (e.g., from the location of the primary computing node 107d1 in this example, such as to verify that the communications are from the associated Communication Manager module 109d and/or are from the primary computing node 107d1). In addition, in this example, the primary computing node 107d1 makes use of non-local storage as it performs its operations for the managed virtual computer network, and in particular in this example mounts a particular non-local block data storage volume 172 that is provided by a non-local server block data storage system 170. While the non-local server block data storage system 170 and associated mounted non-local block data storage volume 172 are illustrated in this example as being part of the data center 190 and being connected to the interconnection network 122, in other embodiments and situations the mounted non-local block data storage volume may instead be located external to the data center 190 (e.g., to be accessible from one of the data centers 160 over the Internet 185). In addition, the non-local block data storage volume 172 may be mounted and made available for use by the primary computing node 107d1 in various manners, including based on the VM Communication Manager module 109d on physical computing system 106d coordinating the interactions between the computing node 107d1 and the remote server block data storage systems 170 (e.g., based on using privileged access of the hypervisor virtual machine monitor of the physical computing system 106d). Furthermore, in some embodiments and situations, one or more copies may also be maintained of the non-local block data storage volume 172 as primary computing node 107d1 makes modifications to the storage—as one non-exclusive example, if another replica computing node of the primary computing node 107d1 is located at another data center 160, a copy of the non-local block data storage volume 172 may be maintained on one or more server block data storage volumes or other computing systems (not shown) at that data center in a manner that is proximate to the replica computing node at that data center, so that the replica computing node at that data center could mount and use that proximate volume copy if that replica computing node is later promoted to be used in place of the primary computing node 107d1. Alternatively, if a determination is later made to use a replica computing node in place of primary computing node 107d1 (e.g., if the primary computing node unexpectedly fails or otherwise becomes unavailable; if the primary computing node is scheduled or otherwise selected to stop providing a type of functionality of the primary computing node, such as to enable maintenance or repurposing of the primary computing node; etc.), replica computing node 107b1 may be promoted to replace computing node 107d1 as the new primary computing node for the replication group, such as by associating the virtual network address previously used for computing node 107d1 with the substrate network address of computing node 107b1, by mounting the logical storage volume 172 (or a proximate copy of it) previously used by computing node 107d1 to now be used by computing node 107b1, etc. Thus, if computing node 107c1 sends a new communication after the promotion of computing node 107b1 to act as the new primary computing node, with the new communication being directed to the virtual network address previously associated with computing node 107d1, the new communication will now be forwarded to the new primary computing node 107b1.

By providing virtual networking functionality using the described techniques, the CNS system provides various benefits. For example, because the various Communication Manager modules manage the overlay virtual network, specified networking devices and other network topology do not need to be physically implemented for virtual computer networks being provided, and thus corresponding modifications are not needed to the interconnection network 122 or switches 119a-119b to support particular configured network topologies of provided virtual computer networks. Nonetheless, if the computing nodes and software programs of a virtual computer network have been configured to expect a particular network topology for the provided virtual computer network, the appearance and functionality of that network topology may nonetheless be transparently provided for those computing nodes by the described techniques. In addition, the use of the described techniques by the CNS system enables replication groups to be used in various manners as desired, such as in a first manner specific to a first managed computer network that is distinct from a second manner specific to a second managed computer network (e.g., based on configuration information specified for the first and/or second managed computer networks).

Thus, various aspects of providing managed computer networks are described above, as well as elsewhere in this document, including to support virtual computer networks that are overlaid on an underlying substrate network. In addition, in at least some embodiments, the CNS system may use multiple communication manager modules in additional manners, such as to emulate responses to networking requests made by computing nodes in the manner of a local physical networking device, including to respond to ping requests, SNMP ("Simple Network Management Protocol") queries, etc. Furthermore, as described in greater detail below, in at least some embodiments, multiple modules of the CNS system may operate together in a distributed manner to provide a particular type of functionality (e.g., functionality corresponding to a particular logical networking device), such that no single module or physical device is singly responsible for emulating that particular type of functionality.

Figure 2C:
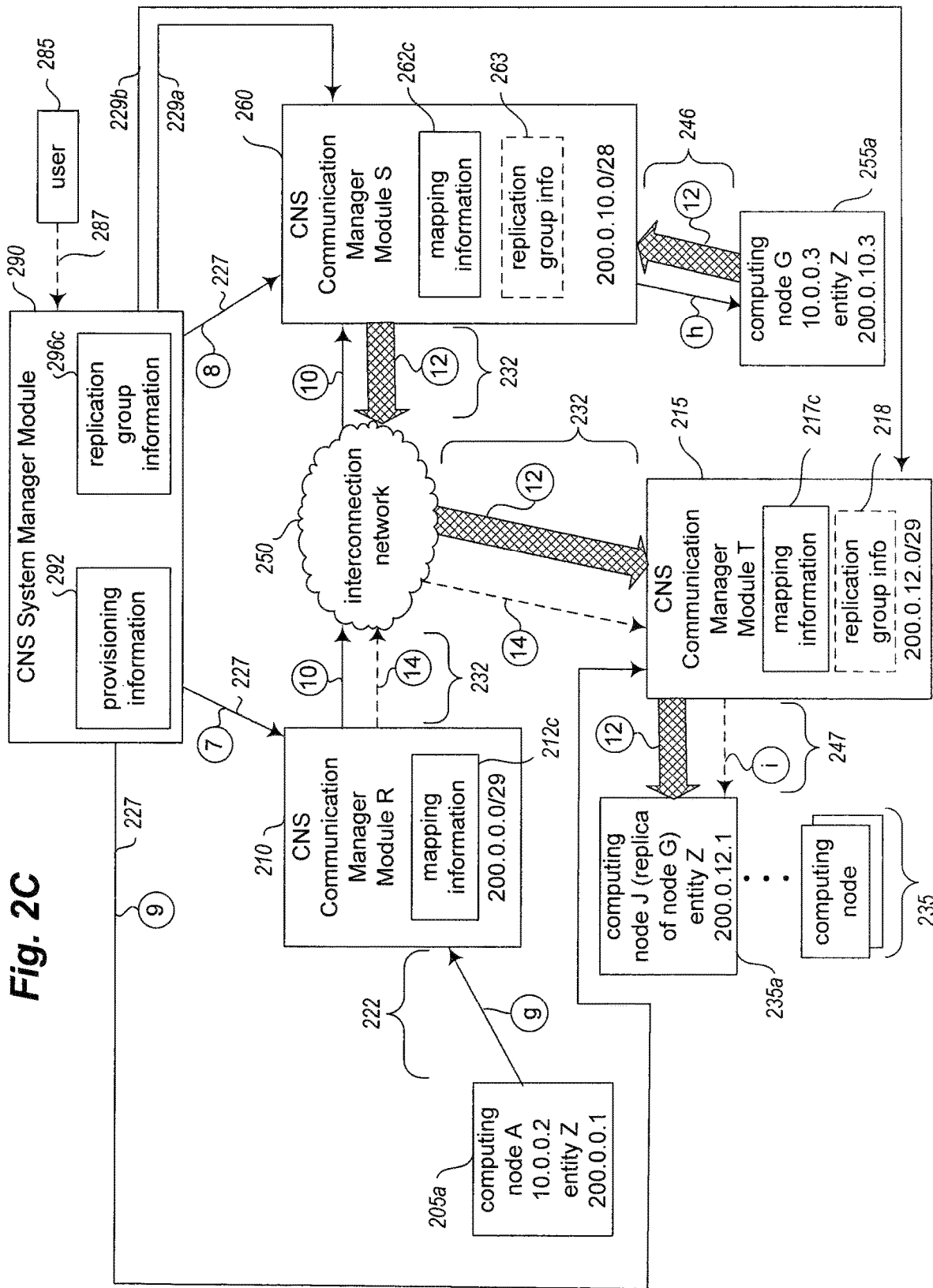
Figure 2D:
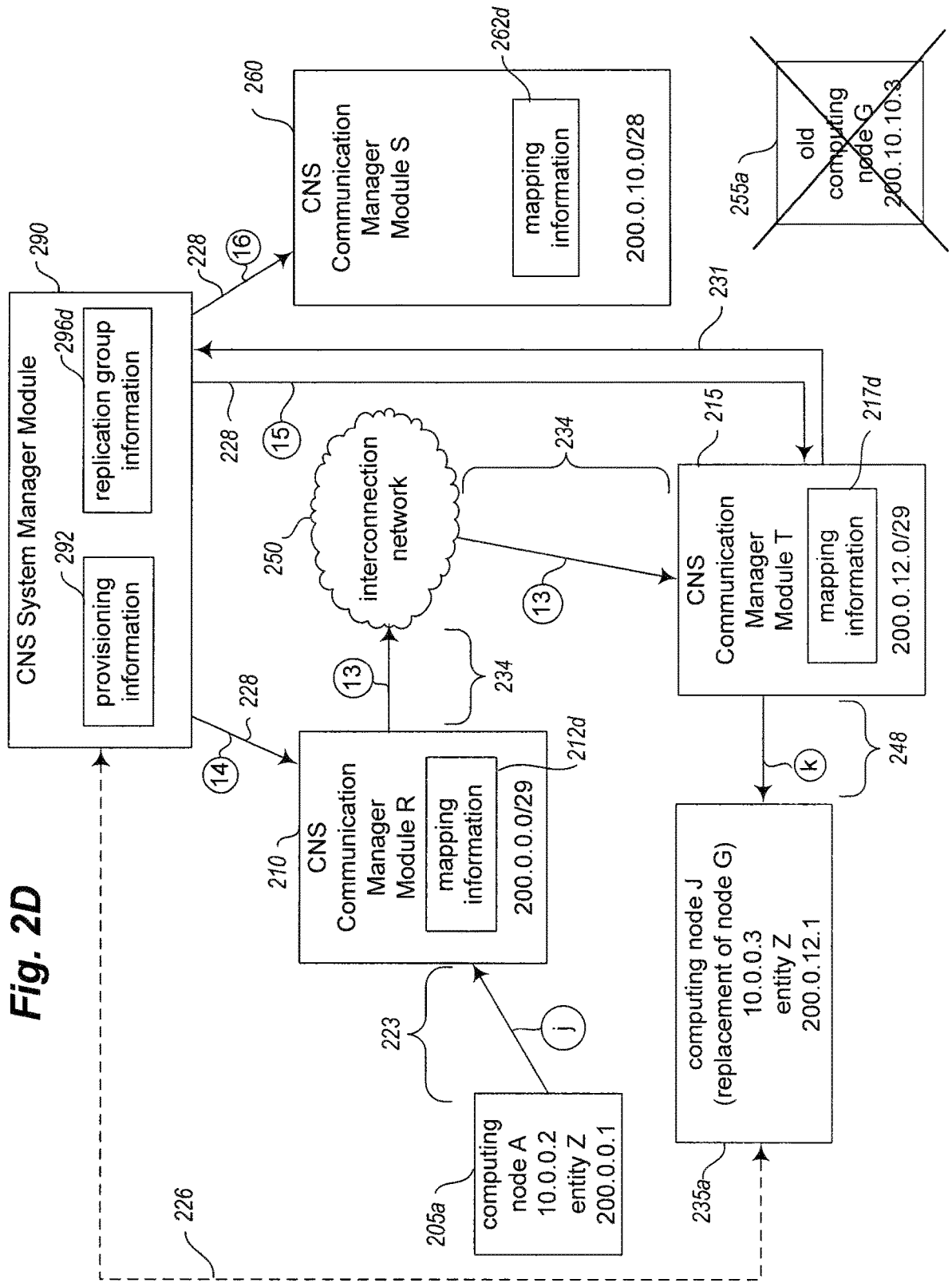
Figure 2E:
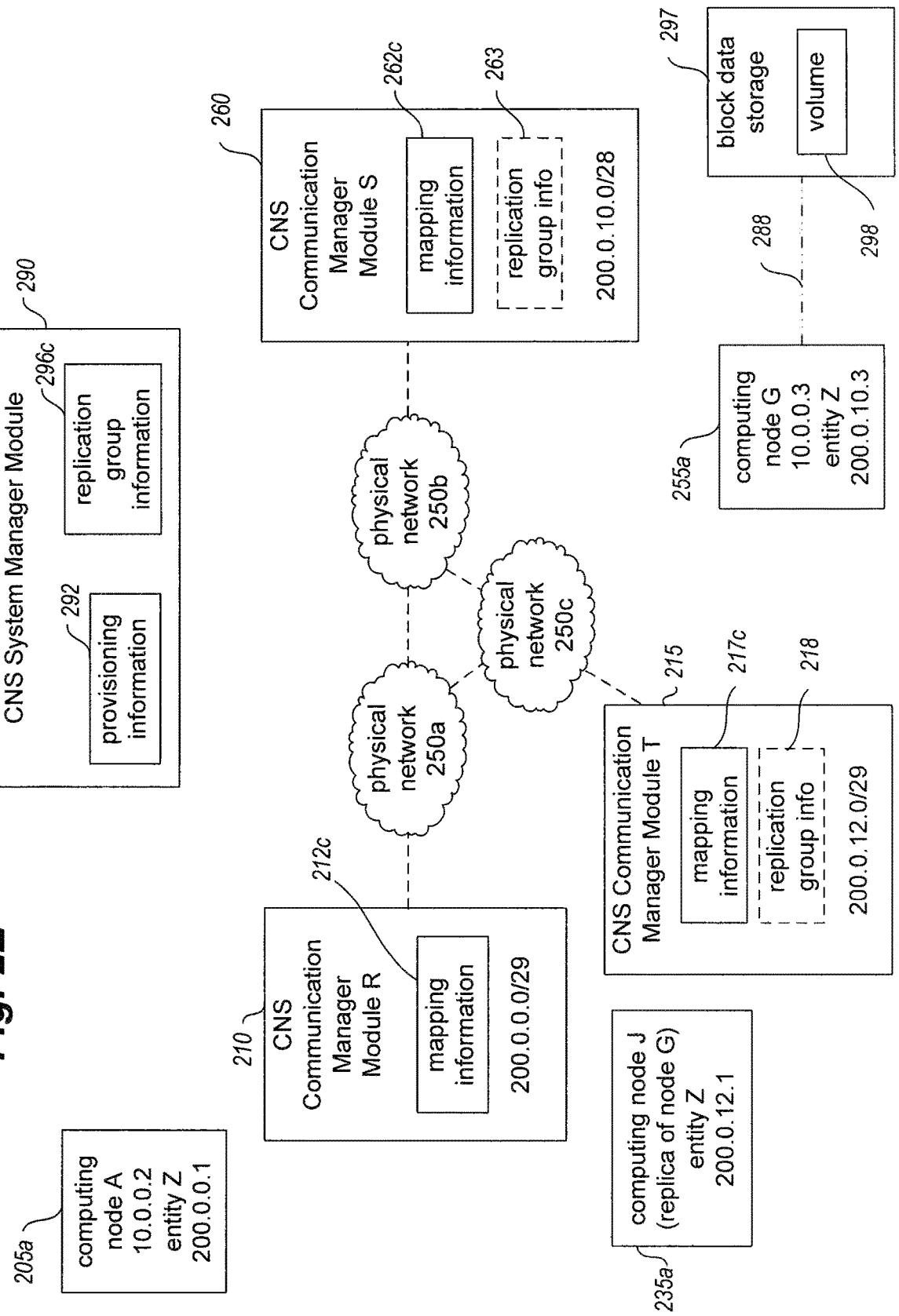

FIGS. 2A-2E illustrate further examples with additional illustrative details related to managing communications between computing nodes that occur via an overlay network over one or more physical networks, including to support computing node replication functionality, such as may be used by the computing nodes and networks of FIGS. 1A and/or 1B, or in other situations. In these examples, FIGS. 2A and 2B illustrate details regarding actions of various modules of an example CNS system in managing communications for computing nodes of a managed computer network as they are sent to their final destinations, while FIGS. 2C-2E illustrate additional details regarding maintaining and using replica computing nodes in various situations, including to transparently replace a primary computing node in a managed computer network with a replica computing node.

In particular, FIG. 2A illustrates various example computing nodes 205 and 255 that may communicate with each other by using one or more intermediate interconnection networks 250 as a substrate network. In this example, IPv4 virtual computer networks are overlaid on an underlying substrate interconnection network 250, with the substrate network being, for example, a distinct IPv4 network or an IPv6 substrate network, although in other embodiments the interconnection network 250 and overlay virtual computer networks may use other networking protocols. In addition, in this example embodiment, the computing nodes are operated on behalf of multiple distinct entities to whom managed computer networks are provided, and a System Manager module 290 manages the association of particular computing nodes with particular entities and managed virtual computer networks, and tracks various configuration information specified for the managed virtual computer networks. The example computing nodes of FIG. 2A include four computing nodes that are executed on behalf of an example entity Z and that are part of a corresponding first managed virtual computer network provided for client entity Z, those being computing nodes 205a, 205c, 255a and 255b. In addition, other computing nodes are operated on behalf of other entities and belong to other provided virtual computer networks, such as computing node 205b that is part of a second managed virtual computer network provided for client entity Y, as well as other computing nodes 255.

In this example, the computing nodes 205 are managed by and physically connected to an associated Communication Manager module R 210, and the computing nodes 255 are managed by and physically connected to an associated Communication Manager module S 260. The CNS Communication Manager modules 210 and 260 are physically connected to an interconnection network 250, as is the System Manager module 290, although the physical interconnections between computing nodes, modules and the interconnection network are not illustrated in this example. As one example, computing nodes 205 may each be one of multiple virtual machines hosted by a single physical computing system, and Communication Manager module R may be part of a hypervisor virtual machine monitor for that physical computing system—if so, communications between the computing nodes 205 and the Communication Manager module R may be passed within that physical computing system without using any intervening computer network, such as via memory of the physical computing system, an internal bus of the physical computing system, etc. For example, with reference to FIG. 1B, computing nodes 205 may represent the virtual machines 107a, and computing nodes 255 may represent the virtual machines 107d. If so, Communication Manager module R would correspond to Communication Manager module 109a of FIG. 1B, Communication Manager module S would correspond to Communication Manager module 109d of FIG. 1B, the interconnection network 250 would correspond to interconnection network 122 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

In this example, each of the Communication Manager modules of FIG. 2A is associated with a group of multiple physical substrate network addresses, which the Communication Manager modules manage on behalf of their associated computing nodes, although in other embodiments each Communication Manager module may instead use a single substrate network address that it shares among two or more associated computing nodes. For example, if the interconnection network 250 is an IPv4 network, Communication Manager module R may be associated with the IPv4 CIDR block 200.0.0.0/29, so as to enable at least some of the IPv4 addresses from 200.0.0.0 to 200.0.0.7 to each be treated as a substrate network address associated with one of the computing nodes, and Communication Manager module S may similarly be associated with the 16 IPv4 network addresses in the IPv4 CIDR block 200.0.10.0/28. Alternatively, if the interconnection network 250 is an IPv6 network, Communication Manager module R may, for example, be associated with the IPv6 network address range of "::0A:01/72", which corresponds to the 128-bit addresses (in hexadecimal) from XXXX:XXXX:XXXX:XXXA:0100: 0000:0000:0000 to XXXX:XXXX:XXXX:XXXA:01FF: FFFF:FFFF:FFFF (representing 2 to the power of 56 unique IPv6 addresses), where each "X" may represent any hexadecimal character that is appropriate for a particular situation—if so, the interconnection network 250 will forward any communication with a destination network address in that range to Communication Manager module R, and with the initial 72 bits of the range specified, the Communication Manager module R may use the remaining available 56 bits to represent the computing nodes that it manages and to determine how to process incoming communications whose destination network addresses are in that range. If the interconnection network 250 is an IPv6 network, the Communication Manager module S may similarly be associated with an IPv6 network address range such as "::0B:02/72".

For purposes of the example shown in FIG. 2A, computing nodes 205a, 205c, 255a, and 255b are part of a single managed virtual computer network provided for entity Z, and computing nodes 205a, 205c and 255a have assigned IPv4 virtual network addresses of "10.0.0.2", "10.0.5.1" and "10.0.0.3", respectively, with an IPv4 virtual network address for computing node 255b not being illustrated in this example. Because computing node 205b is part of a distinct managed virtual computer network that is provided for entity Y, it can share the same virtual network address as computing node 205a without confusion. In this example, computing node A 205a intends to communicate with computing node G 255a, with the two computing nodes configured in this example to be part of a single common physical local area sub-network (not shown) in a configured network topology for the managed virtual computer network, and the interconnection network 250 and Communication Manager modules are transparent to computing nodes A and G in this example. In particular, despite the physical separation of computing nodes A and G, the Communication Manager modules 210 and 260 operate so as to overlay the managed virtual computer network for entity Z over the physical interconnection network 250 for communications between those computing nodes, including to emulate functionality corresponding to the configured local area sub-network of the managed virtual computer network, so that the lack of an actual local area sub-network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding actual physical substrate network addresses, with each of the virtual hardware addresses also corresponding to an IPv4 virtual network address for a particular entity's managed virtual computer network. If the local store 212 does not contain an entry for computing node G (e.g., if none of the computing nodes 205 have previously communicated with computing node G and the System Manager module 290 does not push mapping information to the Communication Manager Module R without request; if a prior entry in local store 212 for computing node G has expired based on an associated expiration time; etc.), the Communication Manager module R interacts 225 with System Manager module 290 to obtain the corresponding actual physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual physical substrate network address is valid, including whether computing node A is authorized to communicate with computing node G (e.g., such as based on being part of the same configured local area sub-network), and if so provides that actual physical substrate network address.

Communication Manager module R receives the actual physical substrate network address for computing node G from the System Manager module 290, and stores this received information as part of an entry for computing node G as part of mapping information 212 for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual physical substrate network address as part of the mapping information entry, and provides the virtual hardware address to computing node A as part of response message 220-b. By maintaining such mapping information 212, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically, upon changes in the information, etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, if the interconnection network 250 is an IPv4 network, the returned actual physical substrate network address corresponding to computing node G in interactions 225 may be, for example, "200.0.10.3", such as if the System Manager module 290 and/or the Communication Manager module S 260 has selected that substrate network address to represent computing node G from the substrate network address range associated with Communication Manager module S 260—thus, a communication sent over the interconnection network 250 to "200.0.10.3" will be routed to Communication Manager module S for handling. Alternatively, if the interconnection network 250 is an IP64 network, the returned IPv6 actual physical substrate network address corresponding to computing node G in interactions 225 may be "::0B:02:<Z-identifier>10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). In this example, the initial 72 bits of the IPv6 network address store the "::0B:02" designation, corresponding to the sub-network or other portion of the physical interconnection network with a network address range of "::0B:02/72" to which Communication Manager module S corresponds—thus, a communication sent over the interconnection network 250 to IPv6 destination network address "::0B:02:<Z-identifier>10.0.0.3" will similarly be routed to Communication Manager module S for handling. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In addition, some or all such information may instead be stored and/or transmitted with a communication to computing node G in other manners in other embodiments, such as by including the information in a header of the communication, including in situations in which the substrate network uses the IPv4 networking protocol.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A (e.g., by Communication Manager module R, based on a configuration of computing node A, etc.). Since computing node A believes that computing node G is part of the same local sub-network as itself, computing node A does not need to direct the communication 220-c to any intermediate logical router devices that are configured in a network topology for the managed virtual computer network to separate the computing nodes.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the actual physical substrate network address corresponding to that virtual destination hardware address from mapping information 212. As previously noted, the actual physical substrate network address may be, for example, "200.0.10.3" or "::06:02:<Z-identifier>:10.0.0.3", and Communication Manager module R creates a new IPv4 or IPv6 header for the encoded new communication (depending on whether the interconnection network is an IPv4 or IPv6 network, respectively) that includes that actual physical substrate network address as the destination address. Similarly, the Communication Manager module R extracts the virtual source network address and virtual source hardware address for computing node A from the header of the received communication, obtains an actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new header of the new encoded communication. In this example, the actual physical substrate network address for computing node A may be "200.0.0.1" (if the interconnection network is an IPv4 network) or "::0A:01:<Z-identifier>:10.0.0.2" (if the interconnection network is an IPv6 network), which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new header (e.g., in accordance with SIIT), including populating the new header with other information as appropriate for the encoded modified communication (e.g., payload length, traffic class packet priority, etc.). Thus, the communication 230-3 includes the same content or payload as communication 220-c, without encapsulating the communication 220-c within the communication 230-3 in this example. Furthermore, access to the specific information within the payload is not needed for such reheadering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network, are associated with the same entity, or are otherwise authorized to inter-communicate; based on an interaction with System Manager module 290 to obtain an authorization determination for the communication; etc.).

After Communication Manager module R forwards the modified communication 230-3 to the interconnection network 250, the interconnection network uses the physical destination substrate network address of the encoded communication to route the communication to Communication Manager module S. In doing so, the devices of the interconnection network 250 do not use information about the overlay virtual network addresses for computing nodes A or G or the entity network identifier for their virtual computer network, and thus do not need any special configuration to forward such a communication, nor even awareness that a managed virtual computer network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior header of the communication 230-3 encoded for the substrate network with a new IPv4 header for the overlay virtual computer network (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then provides communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-f to create communication 230-6 by generating a new substrate network communication header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header for the overlay virtual computer network using mapping information 212. Communication Manager module R then provides response communication 220-d to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may intercommunicate using a IPv4-based managed virtual computer network, without any special configuration of those computing nodes to handle the actual intervening one or more substrate networks, and substrate interconnection network 250 may forward communications encoded for it without any special configuration of any physical networking devices of the substrate interconnection network, based on the Communication Manager modules overlaying the virtual computer network over the actual physical interconnection network.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage, including to optionally use various special reserved multicast group virtual network addresses. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. Similar techniques may be used in some embodiments and situations for particular replication groups, such as to configure Communication Manager modules to forward a communication that is directed to a primary computing node of a replication group to not only that primary computing node but also to any corresponding replica computing nodes. In addition, in some embodiments and situations, at least some broadcast or multicast communications may not be forwarded by Communication Manager modules, such as communications with an IPv4 prefix of 224.0/16 or another designated prefix or other label or identifier. In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without reheadering of the additional communication to use an header for the substrate network since the communication will not travel over the interconnection network. However, if computing nodes 205a and 205c are configured in a network topology for the virtual computer network to be separated by one or more logical networking devices, the Communication Manager module R may take additional actions to emulate the functionality of those logical networking devices.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the interconnection network 250 and/or that natively use the same network addressing protocol as that of the interconnection network) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual destination substrate network address for such a managed computing node, the non-managed computing system may send communications to the associated Communication Manager module for that managed computing node via interconnection network 250 using that destination substrate network address, and that Communication Manager module would forward those communications to that computing node (e.g., after reheadering the communications in a manner similar to that previously described) if the Communication Manager module is configured to accept communications from that non-managed computing system (or from any non-managed computing system). Furthermore, the Communication Manager module may generate a dummy virtual network address to correspond to such a non-managed computing system, map it to the actual substrate network address for the non-managed computing system, and provide the dummy virtual network address to its managed computing node (e.g., as the source address for the communications forwarded to the computing node from the non-managed computing system), thus allowing the computing node to send communications to the non-managed computing system.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses for particular computing nodes of the virtual network. In such embodiments, the communication manager module obtains such configuration information from the virtual computer network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on one or more criteria associated with the communication (e.g., a type of the communication, a size of the communication, a time of the communication, etc.).

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts information from the encoded communication 230-3 that indicates the overlay virtual computer network source and destination virtual network addresses for computing nodes A and G and optionally the entity network identifier(s) for those computing nodes (e.g., from header fields in the encoded communication, or by extracting embedded information in the actual destination substrate network address and actual source substrate network address of the encoded communication 230-3). The Communication Manager module S next exchanges messages 240 with System Manager module 290 to obtain the corresponding actual substrate physical network address for the sending computing node A on behalf of computing node G, including a message 240-4 that includes the extracted virtual network addresses for computing nodes A and G in the overlay virtual computer network, as well as the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A (e.g., "200.0.0.1" or "::0A:01:<Z-identifier>:10.0.0.2"). As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical substrate network address in response message 240-5 matches the source substrate network address used to send the encoded communication 230-3 over the substrate network, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

FIGS. 2C-2E illustrate a further example of managing ongoing communications for the overlay virtual computer network described with respect to FIGS. 2A and 2B for client entity Z, but with additional interactions to facilitate computing node replication for the virtual computer network, including to manage communications to support transparent replacement of a primary computing node of the overlay virtual computer network with a replica computing node. In particular, FIG. 2C illustrates interactions to enable and maintain replica computing nodes for a provided overlay virtual computer network, as well as communications between computing nodes of a managed computer network that include a primary computing node being replicated. FIG. 2D illustrates activities involved in transparently replacing a primary computing node with a replica computing node, and managing subsequent communications between computing nodes and the replica computing node operating in place of the primary computing node, and FIG. 2E illustrates additional details related to replication in a managed computer network in some embodiments.

With respect to FIG. 2C, a further example is illustrated of managing ongoing communications for the virtual computer network described with respect to FIGS. 2A and 2B. In this further example, computing node G 255a is a primary computing node whose replication is enabled and maintained based in part on actions of various Communication Manager modules, such as at a time after the activities previously described in FIGS. 2A and 2B have been completed. In particular, FIG. 2C illustrates computing node A 205a, computing node G 255a, Communication Manager modules R 210 and S 260, System Manager module 290, and interconnection network 250 in a manner similar to that shown in FIGS. 2A and 2B. However, FIG. 2C further illustrates a new Communication Manager module T 215 that manages computing nodes 235 (including computing node J 235a) in a physical location of the substrate network that is different from that of computing node G 255a. FIG. 2C also illustrates example respective substrate network addresses corresponding to the computing nodes A, G and J, with such computing nodes respectively corresponding to substrate network addresses "200.0.0.1", "200.0.10.3", and "200.0.12.1", and similarly illustrates substrate network addresses ranges associated with the Communication Manager modules R, S and T, which correspond to IPv4 CIDR blocks "200.0.0.0/29", "200.0.10.0/28", and "200.0.12.0/29," respectively. Although the replication of computing node G 255a is illustrated in this example as having being initiated after the activities previously described in FIGS. 2A and 2B have been completed, in other embodiments the replication of computing node G 255a may have occurred at an earlier time, such as at a time that the operation of the virtual computer network began and/or at a later time at which computing node G 255a was added to the virtual computer network.

In the example of FIG. 2C, the virtual computer network includes an additional computing node J 235a, which is being maintained in this example as a replica of computing node G 255a. In addition, the System Manager module 290 maintains replication group information 296c in this example that identifies information for each replication group that include a primary computing node and its associated replica computing node(s), as well as information identifying corresponding substrate network addresses for those computing nodes (e.g., "200.0.10.3" for primary computing node G, and "200.0.12.1" for replica computing node J). In some embodiments, such information may be maintained by various Communication Manager modules (e.g., the Communication Manager modules associated with the computing nodes in the replica group, such as modules S and T in this example), whether instead of or in addition to by the System Manager module. Furthermore, in some embodiments, the mapping information 262c, 217c, and 212c may be updated to include information corresponding to the locations of the various computing nodes in the replication group, as well as to optionally include information identifying the replication groups, as discussed below.

The replication of computing node G 255a may be prompted in various manners, such as based on the automated determination of the System Manager module 290, or instead requested by a user (e.g., a user who represents client entity Z, a user who is a human operator of the configurable network service, etc.). In this illustrated embodiment, a user 285 may optionally have initiated replication of computing node G by performing one or more interactive or programmatic interactions 287 with the System Manager module 290, such as by requesting a replica computing node be maintained for computing node G, and optionally by identifying the particular computing node J that is to be used as the replica computing node. For the purposes of this example, replication has been initiated for computing node G to provide a backup computing node that is able to operate to replace the primary computing node G, such as if the primary computing node G fails or otherwise becomes unavailable. For example, in interactions 287, the user may have indicated that a high level of fault-tolerance is desired for the computing node G.

After the determination to replicate computing node G 255a is made, the System Manager module 290 takes various actions in this example to support the replication. In particular, the System Manager module 290 in this example performs one or more interactions 229a with the Communication Manger module S 260 associated with computing node G 255a and one or more interactions 229b with the Communication Manger module T 215 associated with replica computing node J 235a, such as to initiate the execution of appropriate software on and provide appropriate data to computing node J 235a, and to initiate ongoing replication of computing node G 255a on computing node J 235a, with the Communication Manager modules for those computing nodes optionally interacting (not shown) with their associated computing nodes to initiate replication (e.g., such as by interacting with the computing nodes to configure the nodes to perform replication as appropriate). While such interactions 229 may include sending one or more communications over the interconnection network 290 from the System Manager module 290 to the various Communication Manager modules, those details are not illustrated in this example. As part of such interactions 229a and 229b, the System Manager module 290 may provide at least some of the replication group information 296c to the Communication Manager modules S and T, which may be stored locally on those modules, such as shown by optional replication group information 263 and 218, and used by the Communication Manager modules as part of initiating replication. Alternatively, in some embodiments, the initiation of replication of a computing node may include one or more interactions by the System Manager module 290 with the associated computing nodes themselves (not shown), whether instead of or in addition to interactions with the Communication Manager module(s) that are associated with those computing nodes, such as to interact with the computing nodes directly to configure the associated computing nodes to perform replication as appropriate.

In addition, in some embodiments, after the determination to replicate computing node G 255a is made, the System Manager module 290 may optionally perform interactions 227 with the Communication Manager modules R, S and T to modify their locally stored mapping information to include additional information corresponding to some or all of the computing nodes of the replication group, whether instead of or in addition to providing optional replication group information 263 and 218 to modules S and T. For example, the System Manager module 290 may send a message 227-7 to Communication Manager module R to update stored mapping information 212c to indicate that primary computing node G has an associated replica computing node J, such as by adding additional information into a mapping table entry corresponding to node G to identify a network address of the replica computing node J (e.g., a substrate network address and/or a virtual network address) while maintaining other existing mapping information corresponding to computing node G (e.g., computing node G's physical substrate network address, virtual network address, etc.), such that the Communication Manager module R may determine from such additional information that computing node G has a replica computing node and the corresponding substrate network location for that replica computing node. In particular, in this illustrated embodiment, the mapping information may be updated to reflect that computing node G (and its virtual network address of "10.0.0.3") has a corresponding replica computing node J located at substrate network address "200.0.12.1", while still also reflecting that primary computing node G has a substrate network address of "200.0.10.3" (such as may have been originally obtained in interactions 225 of FIGS. 2A and 2B). In a similar manner, the System Manager module 290 may send messages 227-8 and 227-9 to Communication Manager modules S and T, respectively, to update previously stored mapping information or to add an entry for primary computing node G to reflect replication group information corresponding to computing node G. Such mapping information corresponding to replication groups may be used by the Communication Manager modules in various ways in various embodiments, such as to facilitate providing replication data to a replica computing node and/or to facilitate replacing a primary computing node with a replica computing node in a manner that is transparent to other computing nodes of the managed virtual computer network (e.g., computing nodes A, C and H).

Maintaining ongoing replication of the primary computing node G 255a on the replica computing node J 235a, such that the replica computing node J 235a matches or is otherwise consistent with the primary computing node G 255a as it operates and changes execution state, may be performed in various ways in various embodiments. For example, in some embodiments, replication may be performed by constantly and/or occasionally (e.g., periodically or at checkpoints) propagating replication data that indicates the current state of the primary computing node (e.g., the state of volatile and/or non-volatile memory used by the primary computing node, instructions executed by the primary computing node, etc.) to a replica computing node, such that the replica computing node may be updated accordingly to match the primary computing node. In the illustrated embodiment of FIG. 2C, the Communication Manager module S 260 may obtain or otherwise receive such replication data (shown in communication 246-12) from the primary computing node G 255a, with such replication data subsequently being sent to the replica computing node J 235a via the substrate interconnection network 250 as is illustrated in communications 232-12 over the substrate network 250 and communication 247-12 between Communication Manager module T 215 and computing node J235a, in order to update the replica computing node J 235a accordingly. The Communication Manager module S 260 may determine the location of the replica computing node from the replication group information 263 or from the mapping information 262c (e.g., such as if the mapping information 262c includes replication group information identifying the location of corresponding replica computing nodes for a primary computing node), or instead in some embodiments from primary computing node G. In particular, it will be appreciated that in some embodiments the primary computing node G may be configured to initiate the sending of the replication data to the replica computing node J, such as to monitor its own operation and send corresponding replication data to the replica computing node using the overlay network (e.g., by sending replication data in communications specifying a destination address corresponding to a virtual network address assigned to the replica computing node), with the replica computing node being configured to perform appropriate operations to update itself using the received replication data. For example, in some such embodiments, the computing nodes G and J may include software and/or hardware to facilitate such replication, and with computing node G being configured to provide replication data to computing node J via network communications. In other embodiments, the Communication Manager module S may monitor the primary computing node G (e.g., transparently or by interacting with the computing node G) to obtain replication data, which then may be forwarded to the Communication Manager module T, which may use such data to update or otherwise maintain the state of the replica computing node J. In addition, in some embodiments and situations, maintaining replication of a primary computing node may include forwarding copies of all network communications sent to the primary computing node to the replica computing node as well. In some such embodiments, such communications may be forwarded to the replica computing node as part of the replication data 246-12, such as after the communication has been received by the primary computing node G (or its associated Communication Manager module S), while in other embodiments, the CNS system may send copies of communications intended for a primary computing node to the associated replica computing node(s) for the primary computing node in addition to forwarding the communication to the primary computing node.

In the illustrated embodiment of FIG. 2C, at some time after replication has been initiated, computing node A initiates the sending of a new communication 222-g that is intended for computing node G, such as by specifying a destination network address of "10.0.0.3" for the new communication and a destination hardware address for the new communication that is the dummy hardware address provided to computing node A by Communication Manager module R in message 220-b. The Communication Manager module R 210 receives and processes the communication 222-g in a manner similar to that previously described with respect to communication 220-c of FIG. 2A, and forwards the modified communication 232-10 to the interconnection network 250 for forwarding to computing node G, such as based on using the mapping information 212c to determine that computing node G has a corresponding substrate network of "200.0.10.3". The Communication Manager module S 260 receives and processes communication 232-10 in a manner similar to that previously described with respect to communications sent in FIGS. 2A and 2B, and provides the further modified communication 246-*h* to computing node G. After the communication 246-*h* is received by computing node G 255*a*, the computing node may perform various operations as part of its active participation in the virtual computer network, such as in response to receiving the communication 246-*h*, which may result in changes to the execution state of computing node G. Such state changes to computing node G are then replicated on computing node J, such as using one of the replication techniques described above (e.g., based on replication data from computing node G being continuously and/or periodically provided to replica computing node J, such as via one or more communications 246-12).

As previously noted, in some embodiments, maintaining a replica computing node may involve forwarding copies of all network communications directed to a corresponding primary computing node to the replica computing node, to enable the replica computing node to be updated accordingly. In one illustrative embodiment, the CNS system may facilitate duplicating communications that are sent to a primary computing node and forwarding such duplicated communications to the one or more replica computing nodes that are in a replication group with the primary computing node. For example, as part of processing communication 222-*g*, which includes forwarding a copy of the communication to the primary computing node G (as described above), Communication Manager module 210 may determine from an entry corresponding to computing node G in the mapping information 212*c* that computing node G has a corresponding replica computing node J 235*a* located at substrate network address "200.0.12.1". The Communication Manager module 210 may then copy the received communication 222-*g* and modify the communication copy to include the substrate network address for the replica computing node J, which may then be forwarded as communication 232-14 to Communication Manager module T 215. Communication Manager module T 215 may then process the incoming communication 232-14, and optionally provide the further modified communication 247-*i* to the replica computing node J 235*a*, to enable the replica computing node to be updated accordingly as part of the replication of the primary computing node G 255*a*.

It will also be appreciated that, while not illustrated here, the primary computing node G may send a communication to computing node A, such as in response to the received communication 246-*g*, in a manner similar to that previously described with respect to communication 245-*f*. However, in such cases, replica computing node J may not also send the same or a similar communication to computing node A, such as if the replica computing node J and/or the Communication Manager module T are configured to suppress such communications (e.g., if any such outgoing communications from computing node J are discarded by the Communication Manager module T).

FIG. 2D illustrates a further example of managing ongoing communications for the virtual network described with respect to FIGS. 2A-2C, but with those communications being managed to support replacing primary computing node G 255*a* with replica computing node J 235*a* in a manner that is transparent to other computing nodes of the managed virtual computer network, such as at a time after the activities previously described in FIG. 2C have been completed. In particular, FIG. 2D illustrates computing nodes A and J, Communication Manager modules R, S and T, System Manager module 290, and interconnection network 250 in a manner similar to that shown in FIG. 2C.

In this illustrated example, at some time after ongoing replication of primary computing node G has been occurring to maintain replica computing node J as a replicated copy of primary computing node G, and after the communication 222-*g* of FIG. 2C is received by primary computing node G, a determination is made that computing node G should be replaced by a replica computing node. Such a determination may be made, for example, by Communication Manager module T (e.g., based on Communication Manager module T failing to receive replication data and/or a heartbeat message for primary computing node for at least a defined period of time), and if so Communication Manager module T may send a message 231 to the System Manager module 290 to indicate the replacement. In addition, although not illustrated in the examples of FIGS. 2C and 2D, the Communication Manager module T may also (instead of and/or in addition to monitoring received replication data and/or heartbeat messages) send test messages to the primary computing node G or Communication Manager module T to determine whether primary computing node G is still available (e.g., based on return messages or the lack thereof), such as periodically. Furthermore, in some embodiments, the replica computing node J may itself monitor the status of its associated primary computing node G in various ways, and initiate a notification to the Communication Manager module T that primary computing node G is unavailable. In other embodiments, the determination to replace primary computing node G and the subsequent indication may be performed by other modules or systems, such as by Communication Manager module S, by System Manager module 290, and/or by other modules monitoring the activity and/or availability of the primary computing node G. As noted elsewhere, the primary computing node G may become unavailable due to various causes, such as including hardware failure, performance degradation, network access issues, because primary computing node G is tasked for other purposes, etc.

After receiving the message 231, the System Manager module 290 updates replication group information 296*d* (and optionally provisioning information 292) to reflect the replacement of primary computing node G with replica computing node J. In particular, the System Manager module may perform activities to select replica computing node J to replace the primary computing node G, such as by selecting replica computing node J from multiple available replica computing nodes, and with such a selection being performed dynamically in response to the received message 231 or instead at a prior time. In some embodiments, the computing nodes of the replication group may participate in the process, such as via distributed nomination or voting activities. The System Manager module then associates the virtual network address for computing node G (e.g., "10.0.0.3") with the replica computing node J that is replacing the computing node G, such that the virtual network address becomes newly currently associated with the substrate network address for computing node J (e.g., "200.0.12.1") rather than with the substrate network for the replaced prior primary computing node G (e.g., "200.0.12.1"). The System Manager module may then perform various interactions 228 to propagate the changes to the various Communication Manager modules in the virtual computer network, such as to initiate updates to mapping information 212*d*, 262*d* and/or 217*d*. In other embodiments, the updates of the various mapping information may occur in other manners. For example, if the prior mapping information includes a short expiration time for its entries related to virtual network address "10.0.0.3", the prior entries that map the virtual network address to computing node G's substrate network address may quickly be replaced with the updated information when the Communication Manager modules next make a request to the System Manager module 290 for current mapping information for that virtual network address. Alternatively, if the Communication Manager modules had previously stored information about one or more replica computing nodes, such as to indicate that computing node J is the default or first replacement to be used if computing node G becomes unavailable, each of the Communication Manager modules may be configured to independently update their own mapping information to use the substrate network address information for computing node J if the Communication Manager module determines that computing node G is not available (e.g., such as based on receiving a bounce response when next trying to send a communication to computing node G, based on the System Manager module or another Communication Manager module propagating an indication that computing node G is not available, etc.).

The System Manager module 290 may also optionally perform various interactions 226 with computing node J, either directly or via its associated Communication Manager Module T, such as to cause computing node J to begin actively operating in place of primary computing node G. As discussed elsewhere, Communication Manager Module T and/or one or more of the modules may further perform additional activities as part of promoting computing node J to replace computing node G, such as providing computing node J with access to remote network-accessible storage that was previously used by computing node G, ceasing prior activities to suppress communications by or other actions of computing node J that occurred before its promotion, beginning to maintain another computing node as a replica of new primary computing node J, taking steps to terminate the execution of computing node G or to otherwise remove it from being part of the managed virtual computer network, etc.

After the replacement is completed and mapping information 212*d* is updated, computing node A initiates the sending of a new communication 223-*j* that is intended for the same computing node to which prior communications 220-3 and 222-*g* were sent, such as by specifying the same destination virtual network address of "10.0.0.3" for the new communication and the same destination hardware address for the new communication. However, when Communication Manager module R receives the new communication 223-*j*, rather than forwarding it to computing node G via Communication Manager module S as was done for prior communications 220-*c* and 222-*g*, Communication Manager module R instead uses the updated mapping information 212*d* to determine that the destination virtual network address of "10.0.0.3" is currently associated with the substrate network address (and corresponding substrate network location) of computing node J. Accordingly, Communication Manager module R modifies the received new communication 223-*j* to be directed to computing node J via Communication Manager module T, and forwards the modified communication 234-13 to Communication Manager module T via the substrate interconnection network 250. In particular, in a manner similar to that for previous communication 220-*c*, but instead using the updated mapping information 212*d*, Communication Manager module R determines to use the substrate network address "200.0.12.1" corresponding to computing node J for forwarding the new communication over the substrate interconnection network 250. As previously noted, in at least some embodiments, before forwarding communication 234-13 to Communication Manager module T, Communication Manager module R may also perform one or more actions to determine that communication 223-*j* is authorized to be forwarded to computing node J.

After Communication Manager module R forwards the modified communication 234-13 to the interconnection network 250, the interconnection network uses the destination substrate network address of the communication to route the communication to Communication Manager module T. When Communication Manager module T receives communication 234-13 via the interconnection network 250, it performs actions similar to those of Communication Manager module S with respect to communication 230-3. In particular, the Communication Manager module T may verify that communication 234-13 is legitimate and authorized to be forwarded to computing node J, then further modifies communication 234-13 as appropriate for the virtual computer network, and forwards the further modified communication 248-*k* to computing node J 235*a*.

FIG. 2E illustrates additional details with respect to an example implementation of the substrate network 250 that was previously discussed with respect to FIGS. 2A-2D. In particular, as previously noted, in some embodiments the primary computing node G may access and use network-accessible storage to persistently store various information related to the execution state of primary computing node G. FIG. 2E provides a further example that may, for example, correspond to the time of FIG. 2C, at which computing node G was the primary computing node for the previously described replication group, and in this example includes a logical connection 288 between computing node G and a non-local block data storage volume 298 provided by one or more storage devices 297. For example, in some embodiments, non-local block data storage volume 298 may be mounted in a manner that appears to computing node G as if the connection 288 is a local hardware bus or other hardware connection to local storage, while the connection 288 is actually implemented by exchanging communications over the substrate network 250 (and optionally one or more external networks that are not part of the substrate network 250). In such embodiments, as part of the promotion of computing node J that was discussed with respect to FIG. 2D, the logical connection 288 between computing node G and the non-local block data storage volume 298 may be severed, and a new logical connection (not shown) is established between computing node J and the same non-local block data storage volume 298.

In addition, FIG. 2E further illustrates in this example that the substrate network 250 includes multiple distinct interconnected physical networks 250*a*-250*c*, such that each of the Communication Manager modules R, S and T may each be part of a different one of the physical networks. Such physical networks 250*a*-250*c* may each, for example, be in a distinct geographical location (e.g., part of a distinct data center) and/or correspond to a distinct broadcast domain of the substrate network 250. Thus, in such embodiments, the replication of computing node G with replica computing node J and the replacement of computing node G with newly promoted computing node J may be performed despite the separation of computing nodes G and J in different geographical locations and/or substrate network broadcast domains. It will be appreciated that some or all of the details of example FIG. 2E may not be present or used in other embodiments.

Various other types of actions than those discussed with respect to FIGS. 2A-2E may be performed in other embodiments, including for types of network addressing protocols other than IPv4 and/or IPv6.

In some embodiments, one or more modules of the configurable network service may further be configured to perform one or more additional types of functionality in at least some situations, such as by the multiple communication manager modules in a distributed manner and/or by the system manager module. For example, the one or more modules may be configured in at least some embodiments to perform metering or other tracking of the use of a replication group or otherwise of one or more replica computing nodes, including the maintaining of one or more replica computing nodes and/or the promotion of a replica computing node to operate in place of a primary computing node, and to provide information about such tracking for various purposes (e.g., to enable fees to be charged to a user or other client associated with the managed virtual computer network if the corresponding tracked activities are fee-based activities; to provide information to a client associated with the managed virtual computer network and/or to another entity regarding an amount of use of such functionality, such as to enable corresponding client monitoring activities; etc.). As another example, the one or more modules may be configured in at least some embodiments to filter at least some communications forwarded to replica computing nodes, including to limit the rate or total quantity of such communications to be below a specified or determined threshold of use—such rate/quantity limiting or other filtering may be configured in various manners, such as based on configuration information received by a client associated with the managed virtual computer network (e.g., to limit use of a fee-based feature of the managed virtual computer network; to correspond to limitations of one or more computing nodes and/or networking components associated with the computing nodes, such as to limit how often that replication maintenance activities are performed; etc.). The one or more modules may further be configured to filter communications received from replica computing nodes and/or directed to replica computing nodes in at least some embodiments, such as to ensure that the communications are authorized for or otherwise allowed for the managed virtual computer network before those communications are provided to one of the computing nodes of the managed virtual computer network, and/or that such communications are appropriate for a current replication status. In addition, the one or more modules may be configured in at least some embodiments to perform signaling activities if the unavailability of a particular primary computing node and/or replica computing node is detected, such as to notify other modules and/or other computing nodes of the unavailability to enable an update of mapping information used by those modules, as well as to optionally perform other related activities (e.g., to initiate providing a replacement for the unavailable computing node, such as by adding a new computing node to the virtual computer network and/or repurposing another existing computing node of the virtual computer network).

In addition, as previously noted, configuration information that is specified for a virtual computer network may include various network topology information, and various computing nodes may be selected for the virtual computer network and configured in accordance with the network topology in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes of the customer, so as to transparently provide computing nodes of a virtual computer network with the appearance of operating on a dedicated physical network.

In addition, the CNS system may in at least some embodiments establish and/or maintain virtual computer networks via the operation of one or more communication manager modules at the edge of one or more intermediate physical networks, such as by configuring and otherwise managing communications for the virtual computer networks. In some situations, a communication manager module tracks or otherwise determines the virtual computer networks to which the module's associated computing nodes belong (e.g., based on entities on whose behalf the virtual computer networks operate) as part of managing the communications for the virtual computer networks. The determination by a communication manager module of a corresponding virtual computer network for a computing node may be performed in various ways in various embodiments, such as by interacting with a system manager module that provides that information, by tracking software programs executing on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network to which a computing node belongs, such as if the entity maintains multiple distinct managed computer networks between different groups of computing nodes. In addition, in at least some embodiments, one or more system manager modules of the CNS system may facilitate configuring communications between computing nodes, such as by tracking and/or managing which computing nodes belong to which virtual computer networks (e.g., based on executing programs on behalf of a customer or other entity), and by providing information about actual physical substrate network addresses that correspond to virtual network addresses used for a particular virtual computer network (e.g., by a particular customer or other entity).

Figure 3:
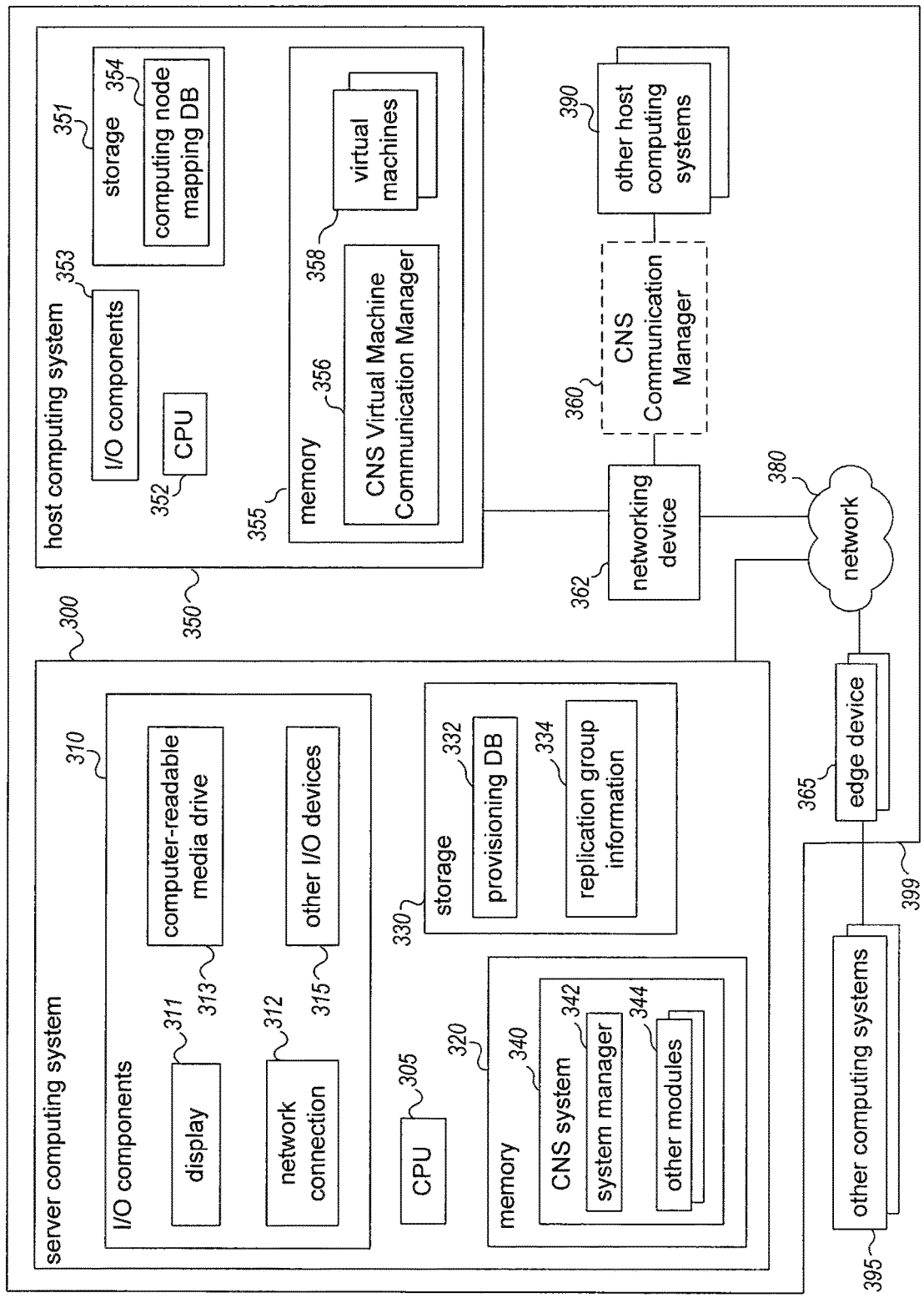
FIG. 3 is a block diagram illustrating example computing systems suitable for executing an embodiment of a system for managing communications between computing nodes and facilitating replication of computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or layer 3 switch. In addition, in this example, one or more edge module devices 365 may be used to connect the internal network 380 at the location 399 to external computer systems at other locations.

The computing system 300 in this example operates to configure and manage virtual computer networks within the group 399, including to facilitate the use of replication groups, as well as to provide other functions (e.g., the provisioning, initialization, and execution of programs on computing nodes). The computing system 300 includes a CPU 305, various I/O components 310, storage 330, and memory 320. The I/O components in this example include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358 and in some embodiments including various software instructions that when executed program the CPU 352 to provide the described functionality. The Communication Manager module 356 maintains various mapping information 354 on storage related to the computing nodes 358 and other computing nodes, such as in a manner similar to mapping information 212, 217 and 262 of FIGS. 2A-2E. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct broadcast domains, physical sub-networks and/or networks.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, and provided to the Communication Manager modules at various times. Similarly, in some cases, additional information about one or more managed virtual computer networks, including information about configured replication groups or other configured network topology information for the one or more managed virtual computer networks, may be stored in the database 334 on storage 330 by the system 340, such as in a manner similar to information 296 of FIGS. 2C-2E, and used to provide corresponding information to the Communication Manager modules at various times, such as in a manner similar to information 263 and 218 of FIGS. 2C-2E. In this example, the system 340 in memory 320 includes a system manager module 342 and optionally other modules 344, with the communication manager modules 356 and 360 being a further part of the distributed CNS system in this example. In addition, the CNS system and the modules 342 and/or 344 may each in some embodiments include various software instructions that when executed program the CPU 305 to provide described functionality.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to maintain and use replication groups for provided virtual computer networks. Such interactions may, for example, enable the computing nodes 358 and/or other computing nodes to inter-communicate over managed virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, edge devices 365, and networking device 362 are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, a particular managed virtual computer network and/or underlying substrate network may in some embodiments span multiple data centers or otherwise span multiple geographical locations, with managed virtual computer networks being configurable to have various types of logical network topologies, and with the underlying substrate networks able to have various physical network topologies. Furthermore, the functionality provided by the illustrated modules may in some embodiments be combined in fewer modules or distributed in additional modules, such as if the functionality of a system manager module and one or more communication manager modules are instead combined into a single module. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the described systems and/or modules may be implemented or provided in other manners, such as by each module or system or by an aggregation of multiple modules and/or systems using means that are partially or fully implemented in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk, a memory, a network, or a portable media article to be read by an appropriate drive or via an appropriate connection. The systems, modules and data structures may also be transmitted in some embodiments as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
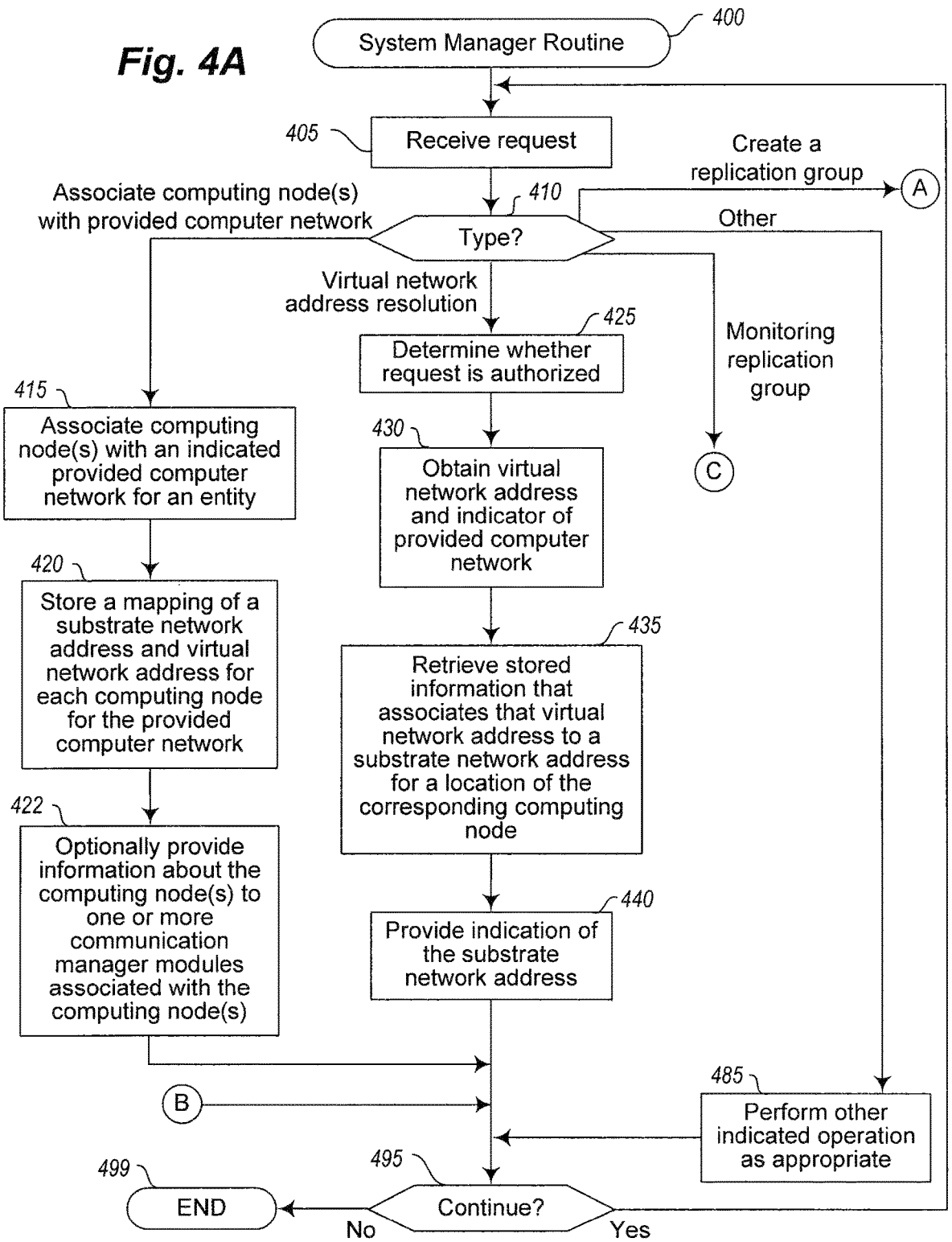
FIGS. 4A-4C illustrate a flow diagram of an example embodiment of a System Manager routine.
Figure 4B:
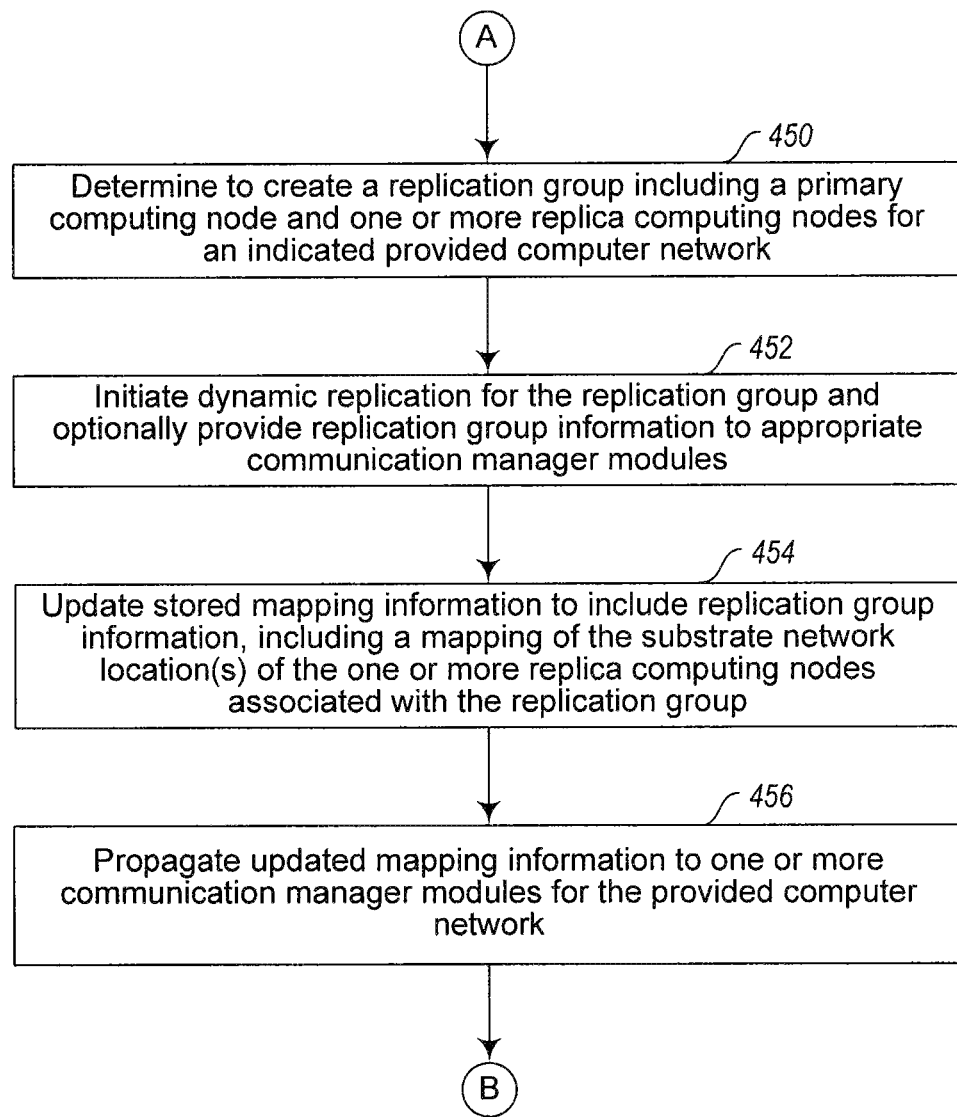
Figure 4C:
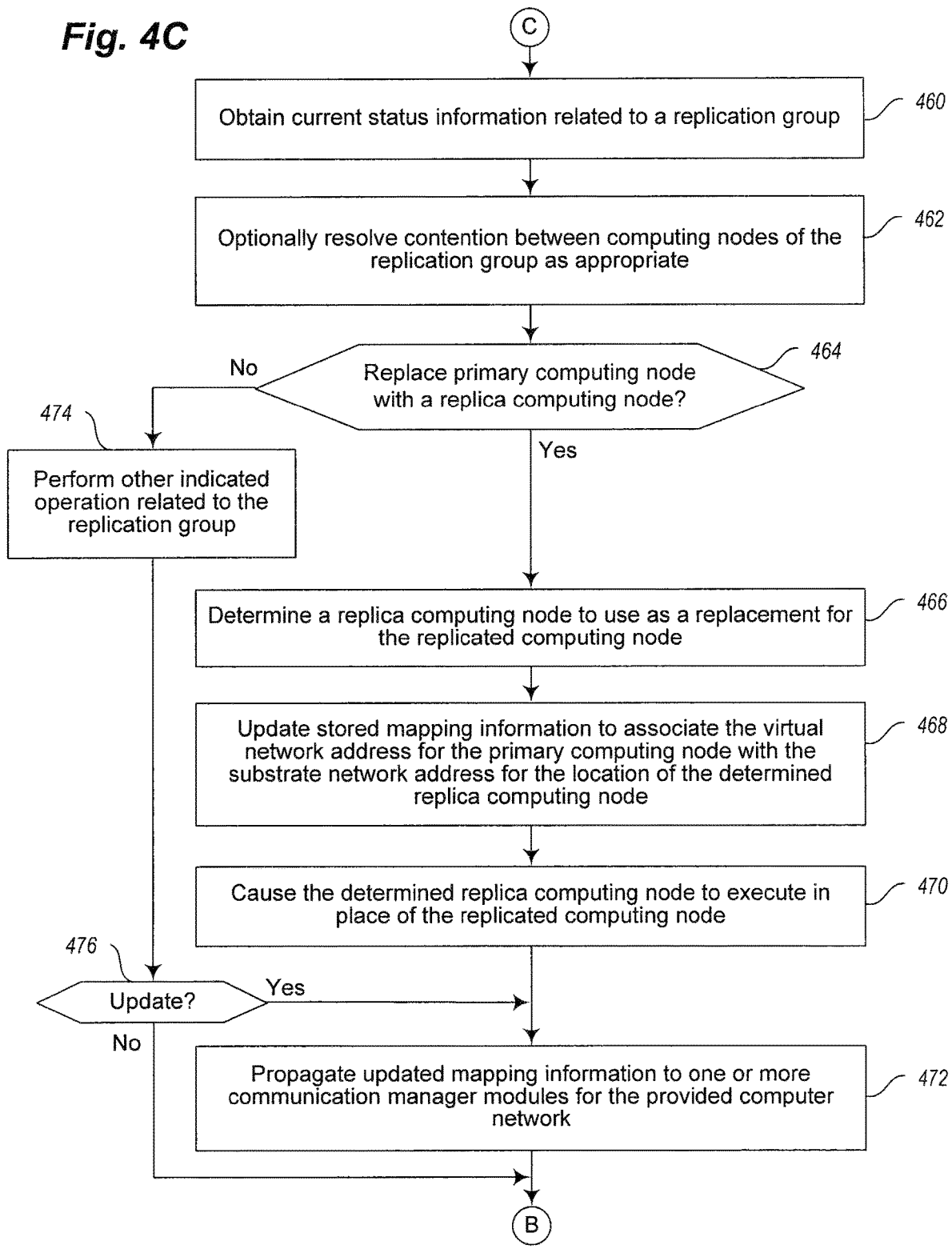

FIGS. 4A-4C are a flowchart of an example embodiment of a System Manager routine 400. The routine may be provided by, for example, execution of the system manager module 110 of FIGS. 1A and/or 1B, the system manager module 290 of FIGS. 2A-2E, and/or the system manager module 342 of CNS system 340 of FIG. 3, such as to assist in managing communications between multiple computing nodes across one or more intermediate networks, including to support maintaining, monitoring and using replication groups for managed computer networks that are provided, as well as to perform other types of management operations in some situations. In at least some embodiments, the routine may be provided as part of a system that manages communications for multiple different entities across a common intermediate substrate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes with a particular managed virtual computer network provided for an indicated entity, such as if those computing nodes are executing one or more programs on behalf of that entity or are to execute one or more programs on behalf of that entity, the routine continues to block 415 to associate those computing nodes with that indicated entity and virtual computer network. In some embodiments, the routine may further determine the one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. As is discussed in greater detail with respect to block 450, one or more of the computing nodes to be associated with the managed virtual computer network may be part of a replication group, in which a primary computing node of the managed virtual computer network is replicated on one or more other replica computing nodes. As is discussed in more detail elsewhere, the primary computing node of a replication group is provided as an active participant in the managed virtual computer network, such as to perform various operations and exchange communications with other computing nodes in the managed virtual computer network, while the one or more replica computing nodes are maintained to be consistent with the primary computing node, but in at least some embodiments and situations do not actively participate with other computing nodes as part of the managed virtual computer network unless and/or until the replica computing node is designated for such active participation in the managed virtual computer network (e.g., such as by being designated to replace the primary computing node or to otherwise take the place of the primary computing node). After block 415, the routine then continues to block 420 to store mapping information for the computing nodes and the managed virtual computer network. In particular, in the illustrated embodiment the routine stores for each computing node an indication of a physical substrate network address corresponding to the computing node, a virtual network address used by the entity for the computing node as part of the virtual computer network, optionally a virtual hardware address assigned to the computing node, and an indication of the associated entity. In addition, as previously noted, at least some managed virtual computer networks may be configured to include replication groups of computing nodes—if so, the information stored for a computing node of a replication group may further in some embodiments indicate that the computing node corresponds to a particular replication group or is otherwise associated with one or more other primary computing nodes or replica computing nodes, and whether the computing node is itself a primary computing node or a replica computing node. In some embodiments, the primary computing node from the replication group may have an associated virtual network address of the virtual computer network and the replica computing nodes may not (e.g., instead only having corresponding substrate computer network address and/or other addresses, at least until the replica computing nodes are designated for active participation), while in other embodiments some or all replica computing nodes may have their own virtual network addresses for the virtual computer network being provided. After block 420, the routine continues to block 422 to optionally provide information about the computing nodes and their configuration to one or more communication manager modules associated with those computing nodes, although in other embodiments the routing instead provides such information upon request from the communication manager modules.

If it is instead determined in block 410 that the type of received request is a request for address resolution for a virtual network address of a target computing node or other computer system of interest, such as from a communication manager module on behalf of a managed computing node that may send communications to that target, the routine continues instead to block 425, where it determines whether the request is authorized in one or more ways, such as based on whether the managed computing node on whose behalf the request is made is authorized to send communications to the target whose virtual network address resolution is requested (e.g., based on the virtual computer network(s) to which the two computing nodes belong), based on whether the managed computing node on whose behalf the request is made is a valid computing node that is currently part of a configured virtual computer network, and/or based on whether the request is received from the communication manager module that actually manages the indicated computing node on whose behalf the request is made. If the request is determined to be authorized, the routine continues to block 430, where it obtains a network address of interest for a particular target of interest, such as may be included with the request received in block 405, or previously stored and currently identifiable for the target based on other received information. The routine then continues to block 435 to retrieve stored information for the target that is associated with the network address, such as may be maintained in globally accessible mapping information—as is discussed in greater detail elsewhere, such mapping information may be maintained to include a current association of a particular target virtual network address to a particular substrate network location of a computing node that currently represents that target virtual network address' computing node (e.g., for a target virtual network address that corresponds to a replication group, to the substrate network location of the primary computing node for the replication group until a replica computing node is promoted to replace the previous primary computing node and become the new primary computing node for the replication group). In particular, the retrieved stored information may include one or more substrate network addresses that are associated with the target network address, such as may be previously stored with respect to block 420 and/or updated with respect to block 468 (e.g., in the case that a primary computing node previously associated with the target network address was replaced with a replica computing node, such as is discussed in more detail in block 468), and optionally may include other information for the target network address (e.g., an associated virtual hardware address, an indication regarding whether the target network address corresponds to a physically implemented computing node with an actual substrate network address or instead to a logical networking device that does not have an actual substrate network address, an indication regarding whether communications sent to the target network address are to also be directed to replica computing nodes for the target computing node, etc.). In some embodiments, if communications from the computing node on whose behalf the request is made to the indicated target computing node are to also be sent to replica computing nodes for that target (e.g., such as in a manner analogous to a broadcast communication), the retrieved information may also correspond in part to one or more of the replica computing nodes that are in a replication group with the primary target computing node, such as to include the actual substrate network address of each replica computing node for the target primary computing node. After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information.

If it is instead determined in block 410 that the received request is an indication to create a replication group for a managed virtual computer network, such as an indication to replicate a particular primary computing node of a managed virtual computer network on one or more other replica computing nodes, the routine continues to block 450 to determine a replication group to create for the managed virtual computer network. The indication to create the replication group may be based on a request from a user configuring the managed virtual computer network (e.g., as part of an original configuration specified by the user to include one or more replicated primary computing nodes and/or based on the user modifying an existing managed virtual computer network to indicate that a particular one or more primary computing nodes of the managed virtual computer network are to be replicated) or based on an automated determination (e.g., as discussed with respect to block 485.) In some embodiments, determining to create a replication group may include determining the primary computing node for the replication group, such as by selecting an appropriate computing node from a group of computing nodes that are available to operate on behalf of an indicated entity in the managed virtual computer network (e.g., based on configuration and/or constraints specified by the entity) and by designating the selected node as the primary computing node to be replicated (as well as potentially initiating execution of programs for a user on that computing node), while in other embodiments determining the primary computing node may be based on receiving an indication (e.g., from a client on whose behalf an associated virtual computer network is provided, from the primary computing node, etc.) that specifies a particular computing node from the managed virtual computer network to be replicated (e.g., a computing node that is already operating on behalf of the entity or has otherwise been selected to operate on behalf of the entity). Additionally, in some embodiments, determining to create a replication group may include determining a number of replica computing nodes to include in the group (e.g., based on configuration information, projected need, etc.) and/or selecting the computing node(s) to operate as the replica computing nodes, such as by being selected from a group of multiple computing nodes that have already been selected for the virtual computer network or by being otherwise selected. In other embodiments, the selection of computing nodes may be performed in other manners.

In block 452, the routine initiates dynamic replication for the created replication group, so as to initiate replication of the primary computing node on the one or more corresponding replica computing nodes. In at least some embodiments, initiating operation of a replication group may include interacting with the communication manager modules that manage communications for the various computing nodes in the replication group, such as to indicate to those modules to begin operations corresponding to replicating the primary computing node on the one or more replica computing nodes, and optionally providing replication group information to such modules (e.g., information identifying some or all of the computing nodes in the replication group, and optionally the status of each such computing node as to whether it is a primary computing node or a replica computing node, types of actions to allow or block for each such computing node, etc.). In other embodiments, the initiation of dynamic replication of the replication group may be performed in other ways, such as by directly interacting with one or more computing nodes of the replication group, or may be performed by the one or more computing nodes of the replication group without explicit management by the modules of the configurable network service.

The routine then continues to block 454 to store information about the created replication group. In some embodiments, such storing may include updating the stored mapping information, such as the mapping information previously stored and/or updated with respect to blocks 420 and/or 468, including to store or otherwise update information associating the primary computing node of the replication group with its replica computing nodes (e.g., information about the substrate network locations of the replica computing nodes). In block 456, the routine propagates at least some of the updated mapping information about the replication group to communication manager modules associated with the provided computer network, such as those communication manager modules who may participate in maintaining the replication group and/or those communication manager modules whose outgoing communications may target the primary computing node, although in other embodiments the routine instead provides such information upon request from the communication manager modules.

If it is instead determined in block 410 that the received request or indication is to perform monitoring of a replication group (e.g., periodically, based on received information indicating possible unavailability of one or more computing nodes of the replication group, etc.), the routine continues instead to block 460 to obtain current status information related to a particular replication group, including to obtain status information regarding whether one or more of the computing nodes in the replication group are active or otherwise available, and/or to obtain information regarding load on one or more of the computing nodes. In some embodiments, the routine obtains status information from some or all of the computing nodes of the replication group, such as by initiating monitoring and waiting for response information, retrieving recently received status information for those computing nodes that has been stored, interacting with one or more other modules or systems to obtain the information (e.g., communication manager modules associated with those computing nodes), etc. For example, in at least one embodiment, the status information for a primary computing node may be provided by a communication manager module associated with a replica computing node for the primary computing node, such as based on that module actively monitoring the status of the primary computing node based on received replication data (e.g., state data and/or status updates, such as heartbeats, etc.) or lack of received replication data associated with the primary computing node. In some embodiments, the monitoring may include sending a test communication to various computing nodes of the replication group and/or to associated communication modules to determine whether those computing nodes are active or otherwise available, such as based upon the responses (or lack of responses) from those computing nodes and/or modules. It will be appreciated that other processes and methods for determining the status of computing nodes may be utilized. For example, in at least some embodiments, the routine may determine the availability of a primary computing node based on determining differences between the primary computing node and one or more of its replicas. In some such embodiments, a replica computing node may be provided that mimics some or all actions performed by the primary computing node (e.g., including processor instructions, memory read/write, storage read/write, etc.), with differences that arise between the primary computing node and the replica computing node performing those actions possibly indicating a transitory or recurring error in the primary computing node (e.g., errors that arise due to a faulty hardware component of the primary computing node, etc.).

The routine then continues to block 462 to optionally resolve contentions, if any, between various computing nodes of the replication group. For example, in some embodiments, the routine may act as an arbiter to resolve contentions that may arise between multiple computing nodes in a replication group based at least in part on the received status information, such as to resolve contentions where multiple computing nodes are attempting to take over for a particular primary computing node that has become unavailable, and/or where a replica computing node is attempting to take over for a primary computing node that is otherwise determined to still be available, etc. Such contentions may be resolved in various ways in various embodiments, such as based on rules and/or priorities (e.g., to always give preference to a primary computing node; to associate priority rankings to the various replicas to enable preferences for replicas with higher priority, etc.). In various other embodiments, contentions may be resolved in various other ways, such as based on the communication manager modules associated with the various computing nodes of the replication group interacting with each other to resolve contentions based on pre-determined rules and/or priorities.

In block 464, the routine determines whether to replace the primary computing node for a replication group with a replica computing node. For example, the routine may determine to replace a primary computing node if the obtained status information indicates that the primary computing node is no longer available to perform its operations, such as may be the case where a primary computing node has become has failed or is otherwise operating at a suboptimal capacity, such as due to hardware errors/failure, network failure or high usage, or some other situation (e.g., high load on a host computer system associated for the primary computing node, etc.). If it is determined in block 464 to replace the primary computing node, the routine continues to block 466 to determine a replica computing node from the replication group to take over for the primary computing node. In some cases, there may only be one replica for the primary computing node, or one of multiple replicas computing nodes may be been previously selected as a default replacement, and in such cases the one replica computing node is selected to be the replacement. In other cases where multiple possible replica computing nodes are available to choose from, various criteria may be used to dynamically determine an appropriate replica computing node to select as a replacement (e.g., based on location of the replica computing node, current load of a host computer system for the replica computing node, etc.). In some embodiments, an indication of which replica computing node is to be used as the replacement primary computing node may instead be received from a communication manager module associated with the replica computing node, such as a communication manager module that monitors the state of the primary computing node and determines that its associated replica should take over or otherwise replace the primary. The routine then continues to block 468 to update stored mapping information, such as to provide a current association of the virtual network address corresponding to the primary computing node being replaced with the substrate network address for the location of the determined replica computing node (e.g., such that at least some communications directed to the virtual network address are no longer forwarded to the primary computing node, but instead to the replica computing node that is taking over for the primary computing node). In block 470, the routine causes the replacement replica computing node to operate in place of the replicated computing node, such as to cause the replica computing node to operate as a primary computing node that actively participates in the managed virtual computer network, as described in more detail with respect to block 581 of FIG. 5. In this illustrated embodiment, the routine may interact with the communication manager module for the replacement replica computing node to cause the replica computing node to operate in place of the primary computing node. The routine then continues to block 472 to propagate updated mapping information to one or more communication manager modules for the provided computer network, such as to those communication manager modules that have previously forwarded outgoing messages to the replaced primary computing node on behalf of an associated computing node or are likely to do so, such that those modules may update their mappings accordingly to forward messages intended for the primary computing node to the replacement replica computing node instead.

If instead in block 464 it is not determined to replace a primary computing node, the routine instead continues to block 474 to perform one or more other indicated operations related to the replication group as appropriate. For example, in some embodiments, the routine may determine to add or remove a replica computing node to a pool of one or more computing nodes that serve as alternatives for providing functionality of the primary computing node, such as based on the pool undergoing increased or decreased load, or may determine that a replica computing node should take over existing operations and/or a session for a primary computing node while the primary computing node continues to handle other operations. Furthermore, in some embodiments, such other operations may also include determining to create a new replica computing node for a replication group (e.g., such as if the current status information indicates that a replica computing node is no longer available; or if a replica computing node was selected for other use, such as having been added to a pool or replaced a primary computing node, etc.). After block 474, the routine continues to block 476 to determine whether to update stored information for the replication group and/or to otherwise update stored mapping information for the group, such as to indicate a location of a new replica computing node added to the group, etc. If so, the routine continues to block 472 to propagate updated mapping information to the one or more communication manager modules for the provided computer network as appropriate.

If it is instead determined in block 410 that the received request is of another type, the routine continues instead to block 485 to perform one or more other indicated operations as appropriate. For example, in some embodiments the other operations may include automatically determining that a new replication group should be created, such as based on determining that a replica computing node has replaced a primary computing node and a replication group is to be created with the replacement computing node as the new primary computing node, or on determining that a particular computing node in a managed virtual computer network is subject to possible failure and/or replacement, or has otherwise been determined to be operationally important (e.g., based on usage or expected critical operation times, etc.). In addition, such other operations may include receiving status information from various communication manager modules associated with computing nodes for the replication groups and storing such information for later use, such as status information indicating that a primary computing node has become unavailable and/or that a replica computing node has taken over or is requesting to take over for a primary computing node. In addition, in some embodiments, the routine may receive requests to update stored information about particular computing nodes, such as if a particular computing node was previously associated with a particular entity and/or a virtual computer network but that association ends (e.g., one or more programs being executed for that entity on that computing node are terminated, the computing node fails or otherwise becomes unavailable, an associated user or other client changes specified configuration information for the computing node, etc.). Similarly, in some embodiments, the routine may receive requests to update stored information about replication groups, such as to indicate that particular computing nodes are to be replicated or to no longer be replicated, etc. The routine may also perform a variety of other actions related to managing a system of multiple computing nodes, as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received address resolution requests for virtual network addresses, the routine may take various actions with respect to block 485 to signal an error and/or perform other corresponding actions as appropriate.

After blocks 422, 440, 456, 472, or 485, or if it is instead determined in block 476 not to update, the routine continues to block 495 to determine whether to continue, such as until an explicit indication to terminate is received. If it is determined to continue, the routine returns to block 405, and if not continues to block 499 and ends.

Figure 5B:
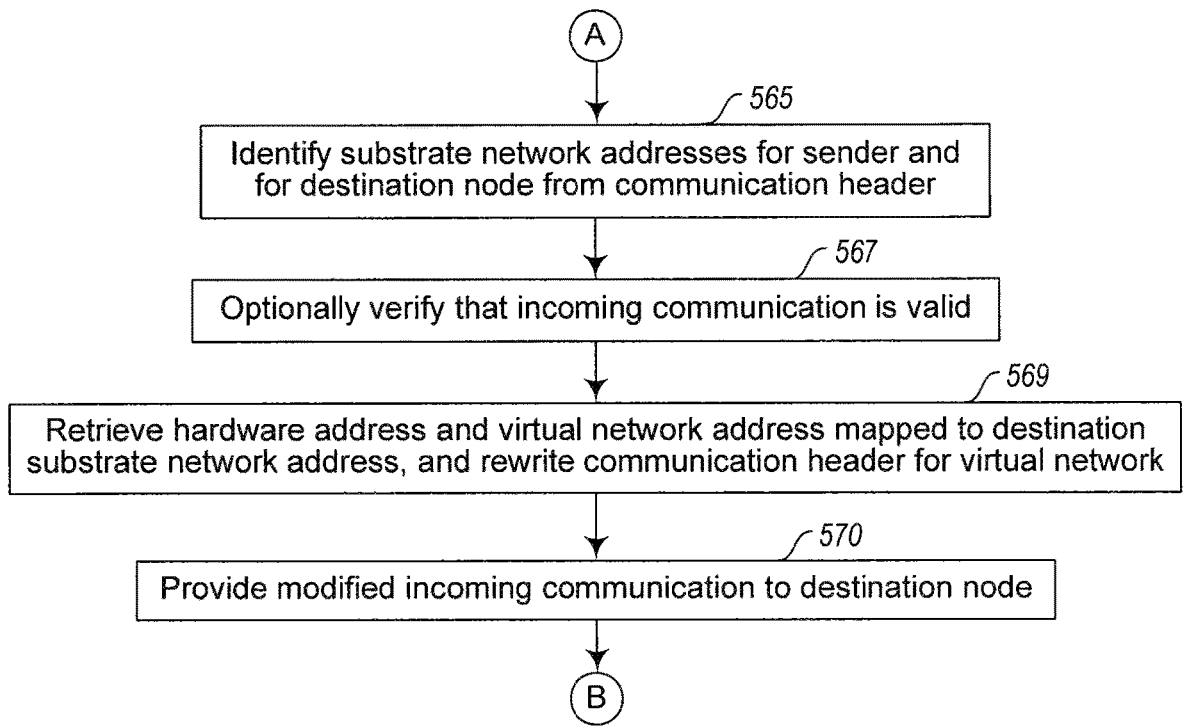
Figure 5C:
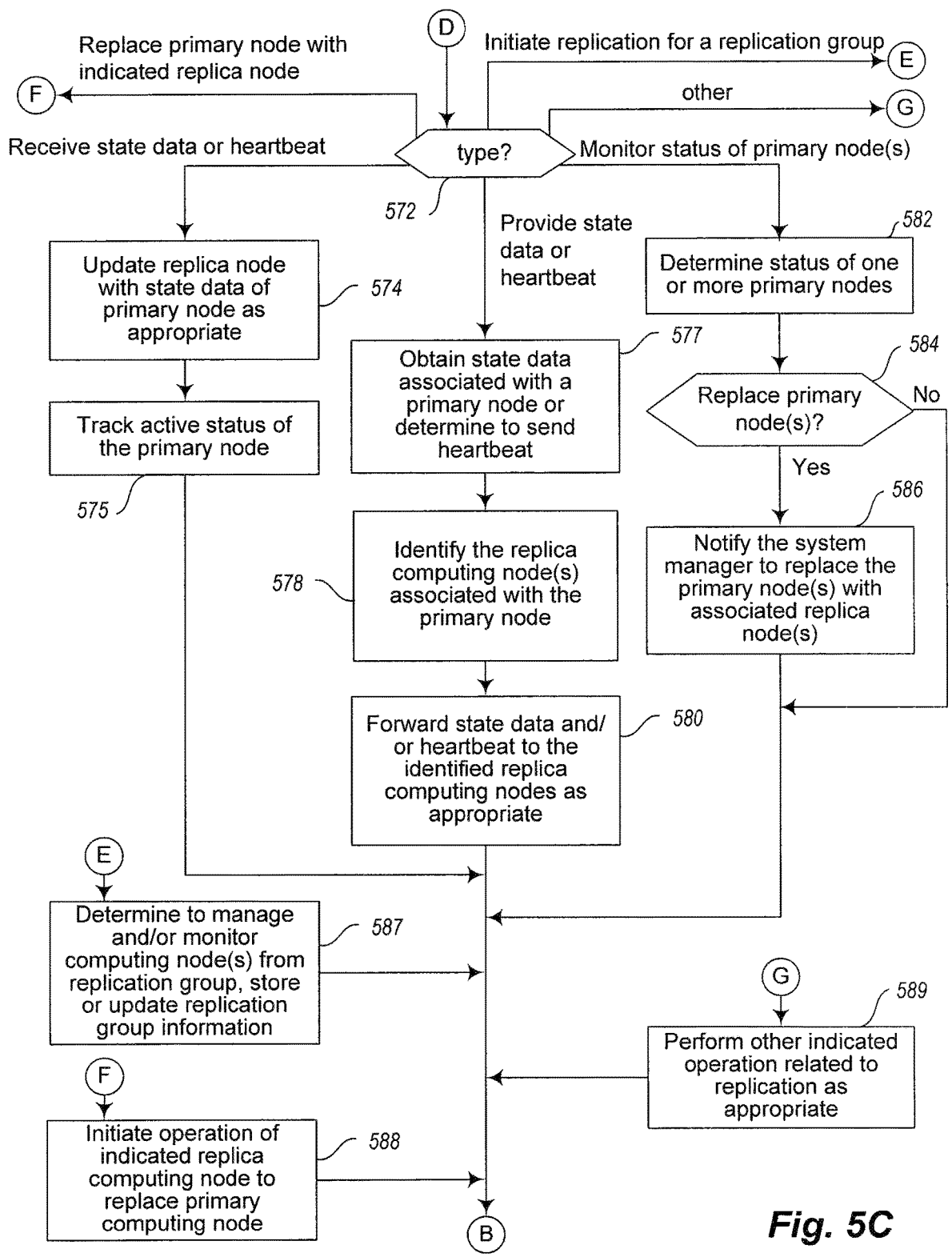

FIGS. 5A-5C are a flow diagram of an example embodiment of a Communication Manager routine 500. The routine may be provided by, for example, execution of the Communication Manager modules 109*a*, 109*b*, 109*c*, 109*d* and/or 150 of FIG. 1B, the Communication Manager modules 210, 260 and/or 215 of FIGS. 2A-2E, the Communication Manager modules 356 and/or 360 of FIG. 3, and/or a communication manager module (not shown) of the CNS service 105 of FIG. 1A, such as to manage communications to and from an associated group of one or more computing nodes in order to provide a private virtual computer network over one or more shared intermediate networks, including to determine whether to authorize communications to and/or from the managed computing nodes, and to support maintaining, monitoring and using computing nodes corresponding to replication groups for managed virtual computer networks.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the target network address of interest indicated in the request. The routine then continues to block 520 to send a request to a system manager module for network address resolution for the indicated target network address for the virtual computer network that is associated with the computing node that provided the request, such as discussed with respect to blocks 425-440 of FIG. 4A. As discussed in greater detail elsewhere, the routine may in some embodiments track information about a virtual computer network and/or entity associated with each managed computing node, as well as information regarding a replication group with which a computing node is associated (e.g., one or more replica computing nodes for a target network address corresponding to a primary computing node or otherwise corresponding to a replication group to which those replica computing nodes belong), while in other embodiments at least some such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. In addition, while in the illustrated embodiment the received request is a request to provide a computing node's link-layer hardware address that corresponds to an indicated networking layer address, in other embodiments the address resolution request may have other forms, or computing nodes may request other types of information about computing nodes that have indicated target network addresses.

In the illustrated embodiment, the routine next continues to block 525 to receive a response from the system manager module that includes a substrate network address and/or other information corresponding to the identified virtual network address, and stores information locally that maps that substrate network address and/or other information to a unique hardware address for later use by the routine (e.g., based on a dummy virtual hardware address generated by the routine or provided in the response), along with other information about the target destination as discussed in greater detail elsewhere. The routine then provides the hardware address to the requesting computing node, which it may use as part of one or more later communications that it sends to the target destination with the indicated target network address. As discussed in greater detail elsewhere, the substrate network address response that is provided may in some embodiments include a substrate network address that is specific to the target destination of interest, while in other embodiments the substrate network address may correspond to a sub-network or other group of multiple computing nodes to which the indicated computing node belongs, such as to correspond to another communication manager module that manages those other computing nodes. In some embodiments, where outgoing communications to a target destination will also be sent to any replica computing nodes for the target destination (e.g., such as in a manner analogous to a broadcast or multicast communication), the routine may obtain and store information corresponding to the location of corresponding replica computing nodes for the target destination. Further, in some embodiments, the routine may obtain and store other information corresponding to a replication group, such as information identifying which nodes are in the group, identifying a type of node in the group (e.g., whether it is a primary or replica), etc. The routine next continues to block 530 to determine if blocks 515-525 were performed as part of the handling of an outgoing node communication, as discussed with respect to blocks 540-560, and if so, continues to block 550. While not illustrated here, in some embodiments the routine may instead receive an error response from the system manager module (e.g., based on the requesting computing node not being authorized to communicate with the indicated destination computing node) or no response, and if so may not send any response to the requesting computing node or may send a corresponding error message to that computing node.

If it is instead determined in block 510 that the type of communication or other message is an outgoing node communication from a computing node managed by the routine to another indicated target final destination that is not a computing node managed by the routine, the routine continues to block 540 to identify the indicated hardware address for the indicated target final destination from the communication header. In block 545, the routine then determines whether that destination hardware address is a hardware address previously mapped to a substrate network address corresponding to the final destination, such as previously discussed with respect to block 525. If not, in some embodiments the routine continues to block 515 to perform blocks 515-525 to determine such a corresponding substrate network address for the outgoing node communication, while in other embodiments such actions are not performed (e.g., if the indicated hardware address is not a mapped address, the routine may cause the outgoing node communication to fail, such as with an error message back to the sending node; if the indicated hardware address is not mapped but the destination network address is an external address, to proceed to perform blocks 550-560; etc.). If the indicated hardware address is a mapped address, or the check is not performed, the routine continues to block 550 to retrieve the substrate network address that is mapped to the destination hardware address. As discussed elsewhere, the destination hardware address may correspond to a primary computing node of a replication group, such that the retrieved substrate network address may correspond to the location of the primary computing node of the replication group; however, in cases where the primary computing node has been replaced by a replica computing node and the corresponding mapping information has been updated (such as is discussed with respect to block 563), the retrieved substrate network address may instead correspond to a location of the promoted replacement primary computing node (previously the replica computing node). If the communication is to be directed to a final destination that is an external computer system at a remote location, the substrate network address that is used may correspond to an edge module or similar device at the current location that will act as an initial destination to facilitate forwarding the communication on to the final destination at another location. Furthermore, as discussed in greater detail elsewhere, the retrieval of the substrate network address to use may include using locally stored mapping information, such as based on a longest prefix match to various entries in the stored mapping information.

The routine then continues to block 552 and rewrites the communication header in accordance with a networking address protocol for one or more intermediate substrate networks between the sending and destination computing nodes using the substrate network address retrieved in block 550. The header rewriting may further include changing other information in the new header, including changing a virtual network address for the sending computing node to be a corresponding substrate network address, and in at least some embodiments includes modifying the received communication without encapsulation as part of an overlay of the virtual computer network over the one or more intermediate substrate networks. Furthermore, for a communication whose destination hardware address corresponds to a logical networking device, the routine in block 552 may further perform other modifications that correspond to providing logical networking functionality to emulate the actions and functionality that would be performed by the one or more logical networking devices that would be used to forward the communication to the destination computing node in accordance with the configured network topology for the virtual computer network.

The routine next continues to block 553 to determine if the outgoing communication is directed to a primary computing node of a replication group, such as based on information related to a replication group that is retrieved in block 550, and optionally previously obtained and stored in block 525. For example, the communication manager modules may in some embodiments support replication by duplicating and sending communications destined for a primary computing node to corresponding replica computing nodes for that primary computing node. If so, in such embodiments, the routine continues to block 555, where the routine optionally determines the destination substrate address(es) for the associated replica computing node(s), and copies the outgoing communication for each replica computing node, such as by rewriting the header information in a similar manner as described with respect to block 552 by using the substrate network address of the replica computing node. It will be appreciated that a communication may be sent to multiple computing nodes of a replication group in other manners in other embodiments, including by using other types of multicast and broadcast technologies.

After block 555, or if it was instead determined in block 553 that the communication was not intended for a primary computing node of a replication group, the routine continues to block 560, where it facilitates providing of the modified outgoing communication (or communications in the case that one or more duplicate communications were created for replica computing nodes in block 555) to the final destination(s), such as by initiating forwarding of the modified outgoing communication over the substrate intermediate network(s) to the final destination(s). While not illustrated here, in other embodiments, various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual computer network, based on the sending and destination computing nodes being associated with different entities that are authorized to inter-communicate, based on the type of communication or other information specific to the communication, etc.). In addition, while not illustrated in this example, in some embodiments incoming communications that are from external computer systems at other locations may further be received by an edge device or other edge module in order to encode those communications for forwarding over the substrate networks to their destination computing nodes, and may be handled by the edge module in a manner similar to that previously described with respect to blocks 550-560.

If it is instead determined in block 510 that the received message is an incoming node communication for one of the computing nodes managed by the communication manager module for the routine from a source that is not managed by the same communication manager module, the routine continues to block 565 to identify the substrate network addresses for the sending and destination computing nodes from the communication header. After block 565, the routine continues to block 567 to optionally verify that the incoming communication is valid in one or more ways. For example, the routine may determine whether the substrate network address for the sending computing node is actually mapped to a computing node that corresponds to the source substrate network address location, such as based on interactions with a system manager module and/or based on other information previously obtained and stored by the routine. In addition, the routine may determine whether the substrate network address for the destination computing node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node. In some embodiments, the routine may also optionally perform various operations if the incoming communication is intended for a replica computing node of a replication group, such as if the communication is a duplicate of a communication sent to a primary computing node. As one illustrative example, in embodiments where replication involves a replica computing node that buffers communications that a primary computing node receives (e.g., such as communications received by the primary computing node between the occurrence of replication checkpoints), the routine may optionally save the duplicated received communication in a buffer (potentially with an expiration time) to be potentially later provided to the replica computing node (e.g., such as when/if the replica computing node replaces the primary computing node). In some embodiments, the routine may optionally suppress incoming communications for a replica computing node (e.g., if those communications are not related to replication), such as by bypassing the subsequent blocks 569-570 and instead continuing to block 595. In other embodiments, the routine may continue to block 569 regardless of whether the intended recipient is a replica computing node, such that communications for the replica computing node may be provided to the replica computing node for appropriate handling by that computing node.

In block 569, the routine then retrieves the hardware address and the virtual network address that are mapped to the destination substrate network address, and rewrites the communication header for the virtual computer network so that it appears to be sent to a computing node with that virtual network address and hardware address. For example, in some embodiments the destination virtual network address may be obtained from the destination substrate network address itself, such as from a subset of the bits of the destination substrate network address. In addition, the destination hardware address may have previously been mapped to the destination substrate network address, such as previously discussed with respect to block 525. In situations in which such prior mapping has not occurred, the routine may instead perform blocks 515-525 to obtain such information, although such actions are not illustrated in this example embodiment. The routine may similarly rewrite the communication header for the virtual computer network so that it appears to be sent from a computing node with a source virtual network address and source hardware address corresponding to the sending computing node. If the recipient is a replica computing node, the destination virtual network address may in some embodiments be set to be the virtual network address of the corresponding primary computing node, while in other embodiments it may be a distinct virtual network address (e.g., if the replica computing node is assigned a virtual network address distinct from that of the primary computing node). Furthermore, in at least some embodiments, the routine in block 569 may further perform other modifications to the incoming communication that correspond to providing logical networking functionality to emulate the actions and functionality that would be performed by one or more logical networking devices that would have been used to forward the communication to the destination computing node in accordance with the configured network topology for the virtual computer network. After block 569, the routine continues to block 570 to facilitate providing of the modified incoming communication to the destination computing node, such as by initiating forwarding of the modified incoming communication to the destination node. In addition, while not illustrated in this example, in some embodiments outgoing communications that are from a source computing node of a virtual computer network to one or more final destination external computer systems at other locations may further be received by an edge device or other edge module in order to decode those communications before forwarding the communications to their final destinations, and may be handled by such an edge module in a manner similar to that previously described with respect to blocks 565-570.

If it is instead determined in block 510 that a mapping information update is received from the system manager module (or optionally from another source, such as another communication manager module), the routine continues to block 563 to update locally stored mapping information to correspond to the mapping information update. For example, such an update may include updating mappings for computing nodes that are or were part of a replication group, such as to update a mapping that newly associates a virtual network address from a primary computing node being replaced to the substrate network address or other substrate network location of the replacement replica computing node, to update the mapping information to include information for new replica computing nodes that have been added to a replication group, to update the mapping information to remove information for replica computing nodes that have been removed from a replication group or from a pool of multiple alternative nodes that include the primary computing node, etc. In other embodiments, the routine may instead delete all mapping information and progressively rebuild the mappings, such as by performing network address resolution requests (e.g., via blocks 515-525), etc.

If it is instead determined in block 510 that a communication or other type of indication has been received corresponding to replication operations, the routine continues to block 572 to determine the type of indication and to proceed accordingly. If it is determined in block 572 that an indication to initiate replication for a replication group has been received, such as a message or other indication sent from the system manager module routine (e.g., at block 452 of FIG. 4A) in situations in which the communication manager module manages a primary computing node and/or one or more replica computing nodes for the replication group, the routine continues to block 587. In block 587, the routine determines to manage and/or monitor one or more of the computing nodes of the replication group, such as based on information provided in the indication, and store or update replication group information using the provided information. For example, in some embodiments, the routine may determine based in part on such information that the communication manager module manages a primary computing node and/or one or more replica computing nodes for a particular replication group, and may begin to perform various operations to support dynamically replicating the primary computing node on replica computing nodes. As is described elsewhere, replication may be performed in various manners in various embodiments, and such operations may include copying or otherwise reproducing the software and/or other data of a primary computing node on the replica computing nodes (e.g., by copying programs and/or data from the primary to the replicas, by causing the replicas to boot or otherwise load the same software images as the primary, etc.); performing ongoing monitoring (e.g., periodically, at checkpoints, etc.) of the execution of the primary computing node, including to determine or otherwise gather information corresponding to the operational state of the primary computing node (e.g., memory and/or storage state, processor instructions executed, communications received, etc.) to provide for updating replicas to match or otherwise be in a consistent state with the primary computing node; etc. In the illustrated embodiment of the routine, a communication manger module associated with a primary computing node, in addition to performing other possible operations, may begin to monitor the operation of the primary computing node to obtain information corresponding to the operational state of the primary computing node for forwarding to the replica computing node(s) for updating, such as described with respect to blocks 577-580. Conversely, a communication manager module associated with a replica computing node, in addition to performing other possible operations, may begin to receive state information corresponding to a primary computing node and maintain the replica computing node as appropriate, such as described with respect to blocks 574-575, as well as to begin monitoring the status of the primary computing node that is being replicated on the associated replica computing node, such as described with respect to blocks 582-586.

If it is instead determined in block 572 that an indication has been received to provide replication data of a primary computing node to one or more replica computing nodes, such as based on a periodic monitoring of the primary computing node, an occurrence of a state change of the primary computing node, and/or another event or indication, the routine continues to block 577. In block 577, the routine obtains state data associated with the executing primary computing node, such as based on interacting with the primary computing node and/or transparent monitoring of the primary computing node by the communication manager module (e.g., by intercepting instructions, communications, and/or other operations performed by the primary computing node, copying memory used by the primary computing node, etc.). In various embodiments, the obtained state data may include current instructions executed by the primary computing node, a current state of volatile memory of the primary computing node (e.g., RAM, processor registers, etc.), a current state of associated non-volatile storage for the primary computing node (e.g., block data storage), etc. In addition, the routine may determine to send a heartbeat message to the one or more replica computing nodes, in addition to or instead of sending state data, so as to indicate that the primary computing node is still operating, and in some embodiments, the routine may determine or otherwise verify that the primary computing node is operating properly prior to determining to send a heartbeat (e.g., by sending a test message to the primary computing node, by receiving periodic heartbeats from the primary computing node, etc.). The routine then continues to block 578 to identify the replica computing nodes that are associated with the primary computing node, such as based on the stored mapping information or other replication group information. The routine then continues to block 580 to forward the state data and/or heartbeat information to the identified replica computing nodes. For example, in some embodiments, the routine may send such communications to the one or more replica computing nodes in the manner described with respect to blocks 540-560, such as by using mapping information corresponding to such nodes. It will be appreciated that in other embodiments, rather than the communication manager module performing the operations indicated in blocks 577-580, the primary computing node may instead perform some or all operations to track and send corresponding replication information and/or heartbeats to a replica computing node. For example, in some such embodiments the primary computing node may include functionality (e.g., software and/or hardware) that monitors the ongoing operation of the primary computing node and sends such information to a replica computing node via the communication manager module, with such communications being handled by the communication manager module as outgoing node communications targeted to a replica computing node, such as in the manner described with respect to blocks 540-560.

If it is instead determined in block 572 that incoming replication data has been received, such as received state data and/or heartbeat information for an executing primary computing node that was sent by another communication manager module associated with that primary computing node (e.g., as described in block 580), the routine continues to block 574. In block 574, the routine performs operations to update the replica computing node with the received state data information as appropriate, such as by applying such data to the replica computing node to update the state of the replica to match the primary computing node, as is described in more detail elsewhere. In block 575, the routine tracks the active status of the primary computing node based on having received the replication data and/or a heartbeat, such as by recording when such data was received to indicate a time that the primary computing node was known to be operational. It will be appreciated that in other embodiments, rather than the communication manager module performing the operations indicated in blocks 574-575, the replica computing node may instead receive communications containing state data and/or heartbeats directly from the primary computing node, and may handle such received communications accordingly to update the state of the replica, with such communications being received by the communication manager module as incoming node communications for providing to the replica computing node, such as in the manner described with respect to blocks 565-570.

If it is instead determined in block 572 that an indication has been received to monitor the status of a primary computing node (e.g., such as based on a request received from a system manager module and/or periodic monitoring of the primary computing node), the routine continues to block 582. In block 582, the routine determines the status of an indicated primary computing node, so as to determine whether the primary computing node is operational or otherwise available. For example, in some embodiments, the routine may use stored status information, such as the status information stored in block 575 to determine if a primary computing node is operational, while in other embodiments the routine may interact with the primary computing node, such as by sending test messages to the primary computing module and determining the status based on responses or lack of responses. In at least one embodiment, where a communication manager module is associated with a replica computing node, the routine may determine whether a primary computing node is still available based on how recently state data and/or heartbeats have been received from the primary computing node (e.g., such as received and tracked in blocks 574-575), such as to determine that a primary computing node is no longer available if data or heartbeats have not been received for at least a threshold amount of time. It will be appreciated that status for a primary computing node may be determined in various other ways in various other embodiments, such as based on indications received from a replica computing node that monitors the operation of the primary computing node. The routine then continues to block 584 to determine whether the primary computing node being monitored should be replaced, such as based on the determined status. If it is determined in block 584 that a primary computing node should be replaced, such as if the status indicates that the primary computing node is no longer available, the routine continues to block 586 to notify the system manager module to replace the primary computing node with a replica computing node, such that the system manager module may manage replacement of the primary computing module (e.g., in the manner described with respect to blocks 460-472 of FIG. 4C). In some embodiments, the routine may indicate to the system manager module that a particular replica computing node being managed by the communication manager module is available to replace the primary computing node.

In block 572, if it is instead determined that an indication has been received to replace a primary computing node with an indicated replica computing node that is being managed by the routine, such as an indication sent by an embodiment of the system manager module at block 470 of FIG. 4A, the routine continues to block 588. In block 588, the routine performs appropriate actions to initiate operation of the indicated replica computing node in place of the primary computing node. For example, in some embodiments, the routine may enable the replica computing node to perform operations that were previously suppressed or otherwise not enabled while operating as a replica, such as to access or otherwise communicate with external resources (e.g., storage, network, etc.). For example, as is discussed elsewhere, the routine may cause the replica computing node to attach a non-local block data storage used by the primary computing node, such that the replica computing node may access and modify such storage, and may begin to support use by the replica computing node of a virtual network address previously used by the primary computing node.

If it is instead determined in block 572 that an indication or a message of another type corresponding to replication has been received, the routine continues to block 589 to perform one or more other indicated operations as appropriate. For example, in various embodiments, such operations may include performing operations to modify a replication group, such as to start/stop computing nodes that have been added to or removed from a replication group, as appropriate; performing operations to monitor replica computing nodes and optionally initiating replacement of replica computing nodes that have become failed or otherwise have become unavailable, and updating status related to such replica computing nodes (e.g., upon request from a system manager module or communication manager module, etc.); etc.

If it is instead determined in block 510 that a message of another type is received, the routine continues to block 592 to perform one or more other indicated operations as appropriate, such as to store information about entities associated with particular computing nodes, store configuration information about network topology information for particular virtual computer networks, respond to requests and other messages from computing nodes in a manner to provide logical networking functionality corresponding to configured network topologies for virtual computer networks (e.g., by emulating actions and other functionalities that would be performed by specified logical networking devices if they were physically implemented), update previously mapped or stored information to reflect changes with respect to computing nodes that are being managed or to remote computing nodes, perform operations to forward communications between multiple managed computing nodes of the communication manager module without forwarding such communications over the substrate network, etc. The storing and/or updating of stored information may be initiated in various manners, such as by receiving information in response to previous requests, periodically requesting such information, receiving information that is proactively pushed to the routine without a corresponding request, etc.

After blocks 560, 570, 575, 580, 586, 587, 588, 589 or 592, or if it is instead determined in block 530 that the processing is not being performed with respect to an outgoing communication or is instead determined in block 584 that a primary computing node is not to be replaced with a replica computing node, the routine continues to block 595 to determine whether to continue, such as until an explicit indication to terminate is received. If it is determined to continue, the routine returns to block 505, and if not continues to block 599 and ends.

In addition, although the routines 400 and 500 have been described as having the system manager module managing replacement of a primary computing node with a replica computing node and propagating updated mappings to reflect such changes, other embodiments may be provided in which a first communication manager module may automatically determine to replace a primary computing node with a replica computing node (such as if the first communication manager module is associated with the replica computing node and determines that the primary computing node has failed, such as based on lack of state data or heartbeats from the primary computing node). Such a first communication manager module may further interact with other communication manager modules associated with computing nodes in the same managed virtual computer network to indicate that the replacement has occurred, with such other communication manager modules updating their locally stored mappings (e.g., based on information sent by the first communication manager module, based on information previously obtained and stored by the other communication manager modules that identifies the substrate network address or other substrate network location information for the replacement replica computing node, etc.).

In addition, various embodiments may provide mechanisms for customer users and other entities to interact with an embodiment of the system manager module for the purpose of configuring computing nodes and their communications. For example, some embodiments may provide an interactive console (e.g. a client application program providing an interactive user interface, a Web browser-based interface, etc.) from which users can manage the creation or deletion of virtual computer networks, the replication of computing nodes, the configuration of specified VLANs for virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS system may be provided in exchange for fees from users or other entities acting as customers or other clients of the CNS system, and if so the mechanisms for such clients to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060,074, filed Mar. 31, 2008 and entitled "Configuring Communications Between Computing Nodes;" and in U.S. application Ser. No. 12/414,260, filed Mar. 30, 2009 and entitled "Providing Virtual Networking Functionality For Managed Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-piece application (e.g., a multi-tiered business application) may in some embodiments use the described techniques to provide functional decomposition and/or isolation for the various types of interacting pieces (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms, the inventors contemplate the various aspects of the invention in any available claim form. For example, while only some aspects of the invention may be recited as being embodied in a computer-readable medium, other aspects may likewise be so embodied.

What is claimed is:

1. A method, comprising:
performing, by one or more computing systems that implement a network-accessible service:
implementing a first computing node for a client at a first geographical location, wherein the first computing node is implemented as a first virtual machine hosted on a first physical host associated with a first substrate address in a substrate network of physical hosts, and assigned a first virtual address in a virtual computer network overlaid on the substrate network;
periodically transmitting state data of the first computing node to a second geographical location, wherein the state data comprises a current state of volatile memory of the first computing node and is used to update a consistent copy of a state of the first computing node in the second geographical location;
determining that the first computing node is not available or has failed; and
in response to the determination that the first computing node is not available or has failed, replacing the first computing node with a second computing node at either the second geographical location or a third geographical location, including:
causing the second computing node to begin actively operating based on the consistent copy of the state of the first computing node, wherein the second computing node is implemented as a second virtual machine hosted on a second physical host associated with a second substrate address in the substrate network.

2. The method of claim 1, wherein the state data of the first computing node further comprises a state of a non-volatile storage device used by the first computing device.

3. The method of claim 1, replacing the first computing node with the second computing node comprises reproducing software of the first computing node on the second computing node.

4. The method of claim 1, wherein causing the second computing node to begin actively operating causing the second computing node to boot using a software image of the first computing node.

5. The method of claim 1, wherein replacing the first computing node with the second computing node comprises terminating execution of the first computing node.

6. The method of claim 1, wherein the replacing of the first computing node with the second computing node comprises removing the first computing node from the virtual computer network.

7. The method of claim 1, further comprising generating, by the network-accessible service, consistent copies of the state of the first computing node at periodic checkpoints.

8. The method of claim 7, wherein the periodic checkpoints comprise regular intervals.

9. The method of claim 7, wherein the periodic checkpoints are initiated by an event.

10. The method of claim 1, wherein replacing the first computing node with the second computing node comprises assigning the first virtual address used by the first computing node to the second computing node.

11. The method of claim 1, wherein the consistent copy of the state of the first computing node is stored as a volume by a block data storage system implemented by the network-accessible service.

12. The method of claim 1, wherein periodically transmitting state data of the first computing node to a second geographical location comprises transmitting state data at regular intervals.

13. The method of claim 1, wherein periodically transmitting state data of the first computing node to a second geographical location comprises transmitting state data upon initiation by an event.

14. The method of claim 1, wherein the state data comprises data regarding an incremental change to a state of a volatile storage device or a non-volatile storage device.

15. The method of claim 1, further comprising causing the first computing node or a third computing node to begin actively operating at the first geographical location based on a consistent copy of the state of the second computing node.

16. A system, comprising:
one or more computing systems that implement a network-accessible service, configure to:
implement a first computing node for a client at a first geographical location, wherein the first computing node is implemented as a first virtual machine hosted on a first physical host associated with a first substrate address in a substrate network of physical hosts, and assigned a first virtual address in a virtual computer network overlaid on the substrate network;
periodically transmit state data of the first computing node to a second geographical location, wherein the state data comprises a current state of volatile memory of the first computing node and is used to update a consistent copy of a state of the first computing node in the second geographical location;
determine that the first computing node is not available or has failed; and
in response to the determination that the first computing node is not available or has failed, replace the first computing node with a second computing node at either the second geographical location or a third geographical location, including to:
cause the second computing node to begin actively operating based on the consistent copy of the state of the first computing node, wherein the second computing node is implemented as a second virtual machine hosted on a second physical host associated with a second substrate address in the substrate network.

17. The system of claim 16, wherein the state data of the first computing node comprises a state of a non-volatile storage device used by the first computing device.

18. The system of claim 16, wherein to replace the first computing node with the second computing node, the network-accessible service is configured to reproduce software of the first computing node on the second computing node.

19. The system of claim 16, wherein to cause the second computing node to begin actively operating, the network-accessible service is configured to boot the second computing node using a software image of the first computing node.

20. One or more non-transitory computer-readable media having stored instructions that when executed on or across one or more processors implement at least a portion of a network-accessible service and cause the network-accessible service to:
implement a first computing node for a client at a first geographical location, wherein the first computing node is implemented as a first virtual machine hosted on a first physical host associated with a first substrate address in a substrate network of physical hosts, and assigned a first virtual address in a virtual computer network overlaid on the substrate network;
periodically transmit state data of the first computing node to a second geographical location, wherein the state data comprises a current state of volatile memory of the first computing node and is used to update a consistent copy of a state of the first computing node in the second geographical location;
determine that the first computing node is not available or has failed; and
in response to the determination that the first computing node is not available or has failed, replace the first computing node with a second computing node at either the second geographical location or a third geographical location, including to:
cause the second computing node to begin actively operating based on the consistent copy of the state of the first computing node, wherein the second computing node is implemented as a second virtual machine hosted on a second physical host associated with a second substrate address in the substrate network.

* * * * *